(12) United States Patent
Senba et al.

(10) Patent No.: US 6,927,738 B2
(45) Date of Patent: Aug. 9, 2005

(54) APPARATUS AND METHOD FOR A COMMUNICATION DEVICE

(75) Inventors: Fujio Senba, Tokyo (JP); Nakamaro Hyodo, Tokyo (JP); Tetsushi Sakane, Tokyo (JP); Jun Fujii, Tokyo (JP); Tomoki Uchiyama, Tokyo (JP); Shigeru Kida, Tokyo (JP)

(73) Assignee: Hanex Co., Ltd., Tokyo (JP)

( * ) Notice: Subject to any disclaimer, the term of this patent is extended or adjusted under 35 U.S.C. 154(b) by 0 days.

(21) Appl. No.: 10/311,607

(22) PCT Filed: Jan. 10, 2002

(86) PCT No.: PCT/JP02/00089

§ 371 (c)(1),
(2), (4) Date: Feb. 24, 2003

(87) PCT Pub. No.: WO02/055315

PCT Pub. Date: Jul. 18, 2002

(65) Prior Publication Data

US 2003/0179151 A1 Sep. 25, 2003

(30) Foreign Application Priority Data

Jan. 11, 2001 (JP) .......................................... 2001-3403
Apr. 23, 2001 (JP) ...................................... 2001-124010
May 9, 2001 (JP) ...................................... 2001-139044

(51) Int. Cl.[7] .......................... H01Q 1/00; G06K 19/06
(52) U.S. Cl. ..................... 343/787; 343/878; 235/492; 235/493
(58) Field of Search .............................. 343/895, 728, 343/787, 788; 235/492, 493; H01Q 1/00; G06K 19/06

(56) References Cited

U.S. PATENT DOCUMENTS 4,486,731 A * 12/1984 Westcott .................... 336/212
6,644,555 B1 * 11/2003 Berney ....................... 235/492

FOREIGN PATENT DOCUMENTS

| JP | A 8-79127 | | 3/1996 | ............ H04B/1/59 |
|---|---|---|---|---|
| JP | A 2000-48152 | | 2/2000 | ............ G06K/19/07 |
| JP | 2000-114854 | * | 4/2000 | ............ H01Q/7/06 |
| JP | 2000-276565 | * | 10/2000 | ............ G06K/19/07 |
| JP | 2000-048152 | * | 2/2002 | ............ G06K/19/07 |

* cited by examiner

Primary Examiner—Trinh Vo Dinh
(74) Attorney, Agent, or Firm—Oliff & Berridge, PLC

(57) ABSTRACT

This invention aims to provide a communication device, installation structure for the communication device, a method of manufacturing the communication device, and a method of communication with the communication device in which the communication device is able to exceedingly restrain a conductive material from attenuating magnetic flux and to expand communication distance even when the communication device is attached to a conductive member e.g., metal, in a closely contacting manner.

This invention has a sheet-like amorphous magnetic material being arranged in a manner extending from a magnetic flux generating portion of a concentric disk-shaped antenna coil of an RFID tag serving as the communication device to an outer area of the antenna coil.

20 Claims, 30 Drawing Sheets

Fig. 3 (b)    Fig. 3 (a)
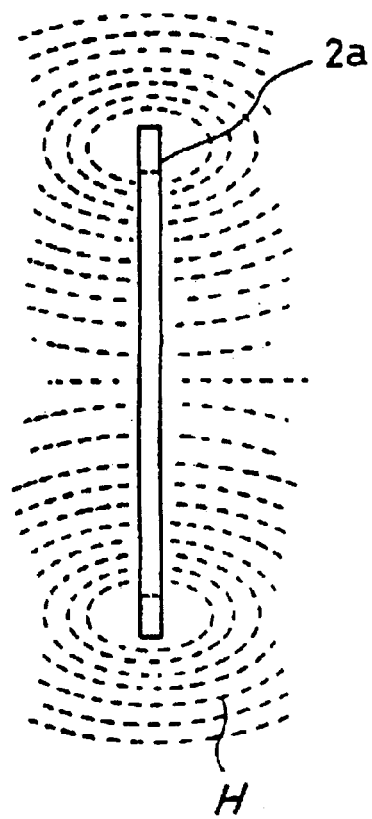
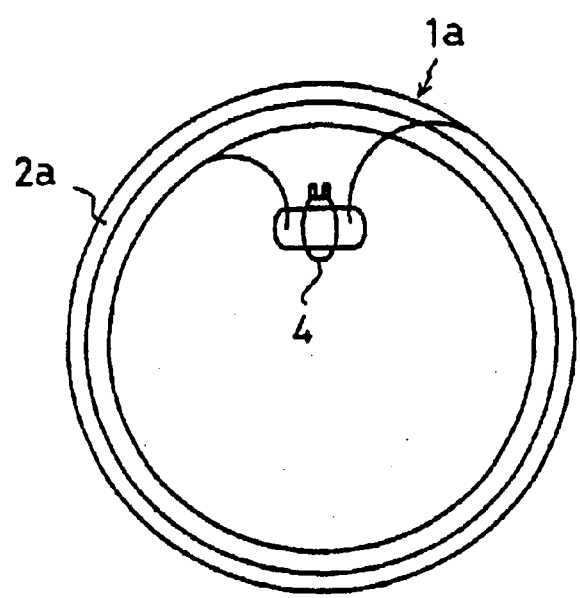

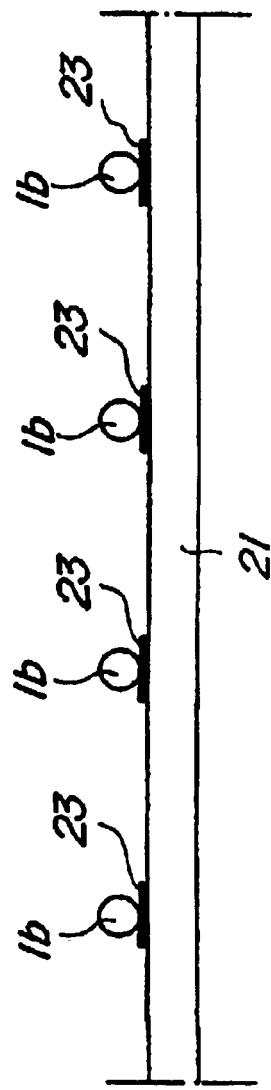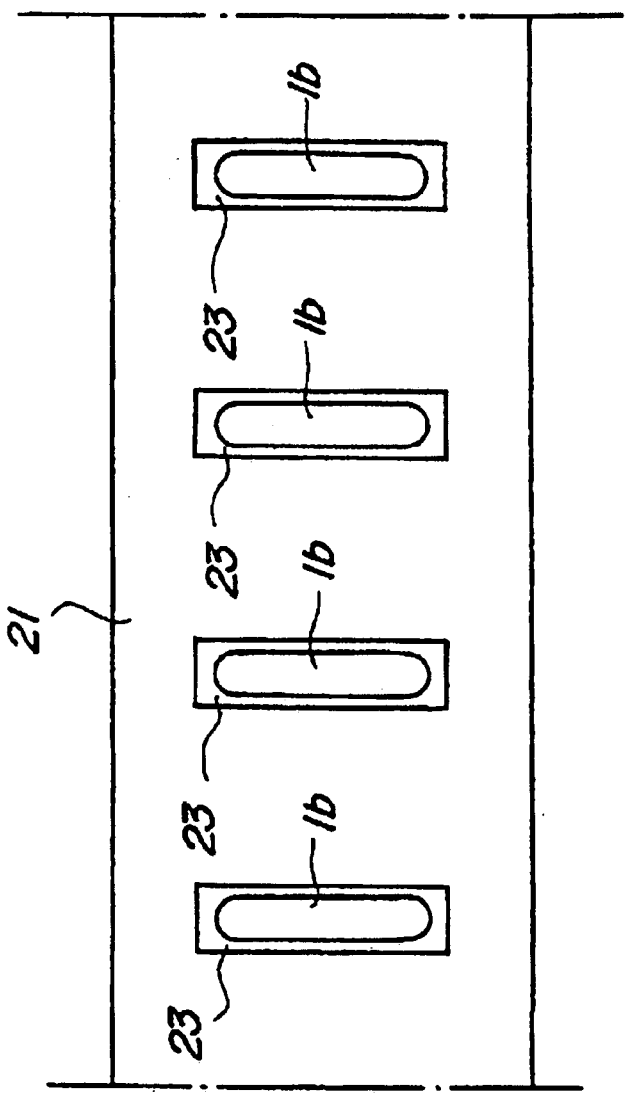
Fig. 25(a)
Fig. 25(b)

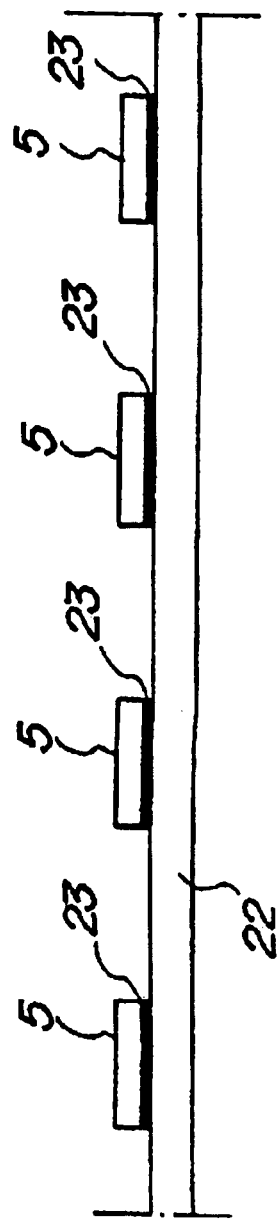
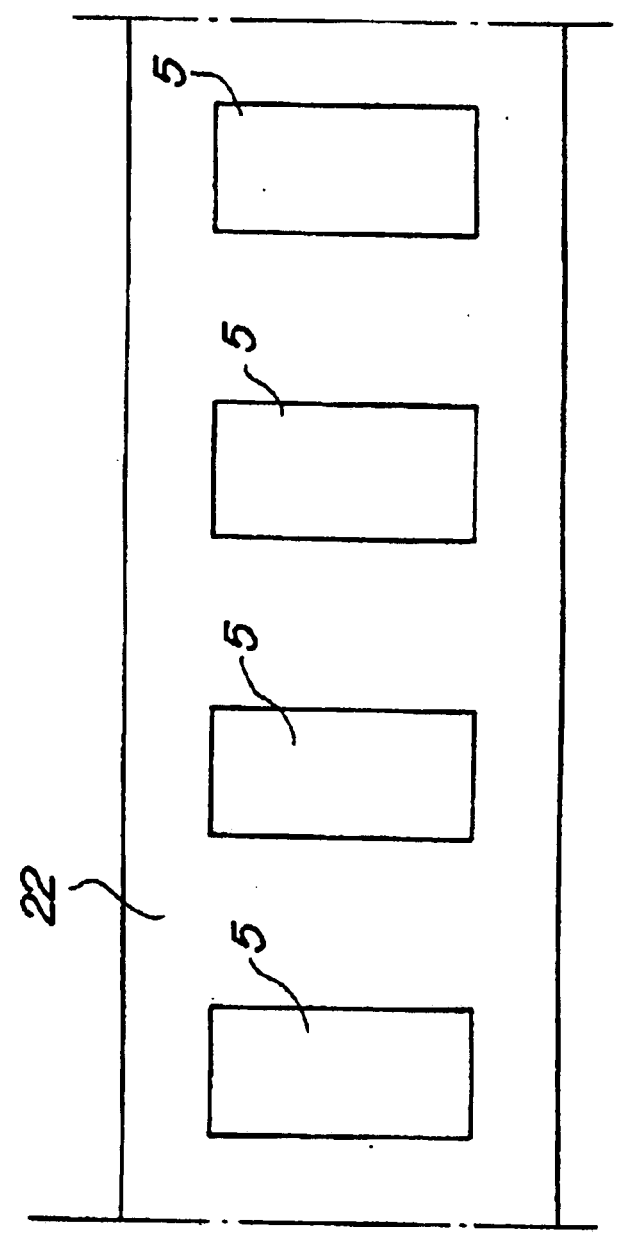
Fig. 26(a)
Fig. 26(b)

APPARATUS AND METHOD FOR A COMMUNICATION DEVICE

TECHNICAL FIELD

This invention relates to a communication device using an antenna coil for communications by electromagnetic wave, an installation structure for the communication device, a method of manufacturing the communication device, and a communication method with the communication device.

The entire disclosure of Japanese patent application No.2001-3403 filed on Jan. 11, 2001, No.2001-124010 filed on Apr. 23, 2001 and No.2001-139044 filed on May 9, 2001, including the specification, claims, accompanying drawings and abstract of the disclosure is incorporated herein by reference in its entirety, in order to claim foreign priority right.

BACKGROUND ART

RFID tags (Radio Frequency-IDentification TAG) having an antenna coil and a control device such as an IC circuit, or data carriers (child) such as non-contact type IC cards are widely used in various fields to serve as communication devices communicating by electromagnetic wave, in which the communication devices communicate with a read/write device (reading device or a read/write device) or the like which serve as a parent.

The RFID tag is, for example, used for purposes such as product management, and the IC card is used for purposes such as transit passes, commuting passes and cash cards. The data carriers can be classified into a portable type and a stationary type being attached to a device, a machine, or various components, in which both types use high frequency electromagnetic wave in a wireless communication area to perform non-contact sending/receiving (communication) of data between a read/write device (or a reading device).

The data carrier itself normally has no electric power source such as a battery for operation, but has a portion of electromagnetic wave sent by the read/write device serving as an electric power source.

FIG. 3 is an explanatory view showing a data carrier structure, and FIG. 4 is a block diagram thereof. As shown in FIG. 3(a), an RFID tag 1a, a conventional communication device serving as a data carrier, comprises a disk shape antenna coil 2a having conductive wires wound to form an air-core coil, and a semiconductor IC chip 4 having an IC circuit connected to both ends of the antenna coil 2a.

As shown in FIG. 4, the semiconductor IC chip 4 comprises: a sending/receiving terminal 4c; a CPU (central processing unit) 4a; a memory 4b having a writable non-volatile memorizing element; and a capacitor 4d for power storage means. The antenna coil 2a and the semiconductor IC chip 4 are formed into a thin disk-shape or a card shape by being molded into a united body with a resin material, or formed into a sealed shape by being laminate-processed for protection from the external In explaining a sending/receiving method of the RFID tag 1a with reference to FIG. 4, a read/write device (not shown) first sends an electromagnetic wave for calling the RFID tag 1a and for transmitting electric power. The RFID tag 1a then receives the electromagnetic wave by a tuning effect of the antenna coil 2a and the sending/receiving terminal 4c, and stores the electric power inside the capacitor 4d. Subsequently, the RFID tag 1a becomes operational to then send an electromagnetic wave from the read/write terminal to the RFID tag 1a for a readout purpose in the following step.

Then, the electromagnetic wave enters from the antenna coil 2a of the RFID tag 1a to the CPU 4a via the sending/receiving terminal 4c; then, the CPU 4a reads out necessary information from the memory 4b in accordance to the entered electromagnetic wave; and then, the information in a form of an electromagnetic wave is sent from the sending/receiving terminal 4c to the read/write device via the antenna coil 2a. The above method is also employed when writing data from the read/write device to the memory 4b of the RFID tag 1a. It should now be noted that the above consecutive steps are relatively performed instantaneously.

FIG. 3(b) is an explanatory view showing a relation between the antenna coil 2a and an electromagnetic wave. An electromagnetic wave used in communication generally can be referred as an electric field and a magnetic field simultaneously propagating while being normal to each other, in which the communication with the electromagnetic wave performs sending/receiving with use of an electrical current (high frequency electrical current) flowing in the antenna coil 2a by interlinking the magnetic field and the antenna coil 2a.

For example, when an electromagnetic wave is sent from the antenna coil 2a, a high frequency electrical current flowing at the antenna coil 2a allows a high frequency magnetic field component H (as illustrated in FIG. 3(b)) to be distributed as a loop (magnetic flux loop) passing through a center of the antenna coil 2a, and the read/write device is able to receive information from the RFID tag 1a by placing an antenna coil of the read/write device in an area of the magnetic flux. Likewise, when an electromagnetic wave is sent from the read/write device, the magnetic field component H is distributed as illustrated around the antenna coil 2a of the RFID tag 1a to allow the antenna coil 2a to receive the electromagnetic wave.

Communication distance, that is, the communicable distance between the RFID tag 1a and the read/write device is normally a couple millimeters to a couple centimeters. For example, an automatic gate for trains hardly has any trouble in communicable distance since the data carrier such as a commuting pass could be read out by inserting and skimming the pass closely upon the reading portion arranged inside the automatic gate.

However, in a case such as attaching a data carrier such as an RFID tag upon a product for product management, the use of the data carrier would be restricted if the communication distance is short. Other cases may also require high communication directivity in a particular direction depending on the type of management. Therefore, various methods of extending communication distance and improving directivity for the data carrier have been proposed in the past.

The communication distance using electromagnetic wave requires a sending antenna coil and a receiving antenna coil to be arranged within an area of the magnetic field for maintaining a communicable magnetic flux density level. Although the size of the communicable area for the magnetic field, that is, the communication distance relies on a power level of the sending side, the directivity of the antenna coil of the RFID tag is an influential factor when power level of the sending side and the receiving side are equal.

In a case such as attaching an RFID tag to a metal surface, the alternating magnetic field produced by an electromagnetic wave purposed for tag sending/receiving creates an eddy current inside the metal. The eddy current produces a magnetic flux opposing to a magnetic flux purposed for sending/receiving and thereby attenuates the magnetic flux purposed for sending/receiving and causes difficulty in sending/receiving. A material for attenuating the initial magnetic flux will hereinafter be referred to as "conductive material".

A known method in attaching a member made from a conductive material to an RFID has a magnetic material arranged between the RFID tag and the attaching surface of the conductive material for passing a sending/receiving magnetic flux thereto so that the magnetic flux can enter the conductive material and restrain the creation of an eddy current.

Furthermore, a method, which has a sheet-like amorphous magnetic material with a higher magnetic permeability (hereinafter referred as "sheet-like magnetic material") serving as the magnetic material, is proposed as a method using a thin sheet for efficiently bypassing a magnetic flux without increasing much space (as shown in Japanese Patent Publication Hei 8-79127).

With the foregoing conventional example shown in Japanese Patent Publication Hei 8-79127, the sheet-like magnetic material is arranged across the entire surface of the sending/receiving antenna coil of the RFID tag. However, through the findings of the inventors of this invention, even if the sending/receiving sensitivity of the RFID tag is slightly improved compared to a situation where the sheet-like magnetic material is not arranged entirely across the antenna coil, there is not much difference from a practical aspect; in some cases, a closed loop which passes through the sheet-like magnetic material is created to adversely result in decline of sensitivity.

In a method proposed in Japanese Patent Publication No.2000-48152, the RFID tag 1a is comprised of a disk-shaped antenna coil 2a having an insulated wire such as an enamel wire wound around a circular air-core coil, and a semiconductor IC chip 4 connected to both ends of the antenna coil 2a, in which the antenna coil 2a has a thin sheet-like magnetic material constituted of an amorphous sheet inserted therethrough. The sheet-like magnetic material has a surrounding thereof covered with an insulated sheet to prevent the sharp edges of the sheet-like magnetic material from damaging an insulated covering formed at the surface of the antenna coil 2a.

The sheet-like magnetic material is chosen to have a width smaller than the diameter of a hollow portion of the antenna coil 2a for being inserted into the antenna coil 2a, and after the sheet-like magnetic material is inserted into the antenna coil 2a, the sheet-like magnetic material and the antenna coil 2a are pressingly shaped into a flat form.

Since the sheet-like magnetic material has an exceedingly low magnetic resistance compared to that of the air, the magnetic flux interlinking with the antenna coil 2a easily extends in a longitudinal direction of the sheet-like magnetic material and is distributed into the air as a magnetic flux loop passing through the tip-end portion of the antenna coil 2a. Accordingly, communication distance is extended mainly in the longitudinal direction of the sheet-like magnetic material, and communication directivity is also heightened in thus direction.

However, with the foregoing method proposed in Japanese Patent Publication No.2000-48152, manufacturing is difficult and laborious since the sheet-like magnetic material is required to be inserted to the antenna coil 2a. There is also a risk of damaging the insulated covering of the antenna coil 2a when the sheet-like magnetic material and the antenna coil 2a are pressingly shaped into a flat form after the sheet-like magnetic material is inserted into the antenna coil 2a, and therefore, a means for preventing such risk is required.

The RFID tag 1a having the antenna coil 2a and the semiconductor ID chip 4 integrally sealed with resin is generally produced in mass numbers, and standard products with short communication distance are being sold in the market inexpensively. However, with the foregoing method, it would be necessary for the standard products to be manufactured in another different process since the sheet-like magnetic material 8 is required to be inserted into the antenna coil 2a.

DISCLOSURE OF THE INVENTION

This invention serves to solve the foregoing problems and aims to provide a communication device, an installation structure for the communication device, a method of manufacturing the communication device, and a method of communication with the communication device in which the communication device has a sheet-like magnetic material with a high specific magnetic permeability being arranged thereto in a manner extending from a particular portion of an antenna coil of the communication device to an outer area of the antenna coil so as to exceedingly restrain a conductive material from attenuating magnetic flux and to expand communication distance even when the communication device is attached to a conductive member e.g., metal, in a closely contacting manner.

Although there are the following two types of antenna coils for a communication device, where one being a concentric disk shape (circular coil with an empty core) and the other being a cylindrical shape formed by spirally coiling a conductor to a rod-like magnetic material core, the inventor (s) of this invention found through research and experimenting that both types having a sheet-like magnetic material with a high specific magnetic permeability (hereinafter simply referred as "sheet-like magnetic material") arranged thereto in a manner extending from a magnetic flux-generating portion (main portion for generating magnetic flux when applying an electrical current to the antenna coil based on Ampere's law) to an outer area of the antenna coil can restrain a conductive material arranged closely contacting to the communication device (e.g., an RFID tag) from reducing sensitivity and can also heighten the directivity in the extending direction and expand communication distance.

The communicable magnetic flux area in the extending direction would expand more compared to when the sheet-like magnetic material is not extended.

For example, when using a concentric disk-shaped antenna coil, the magnetic flux-generating portion exists in an intermediary portion between a diametral center of the antenna coil and an inner peripheral portion of the antenna coil, in which a magnetic flux forms a loop of a relatively high density around a conductor wire of the antenna coil via the magnetic flux-generating portion.

The magnetic flux-generating portion exists not as a point but as a relatively small area in which such area has an intermediary point between the diametral center of the antenna coil and the inner peripheral portion of the antenna coil serving as a center thereof. Therefore, when an increase of directivity in an outward surface direction (radius direction) for a particular surface of the concentric disk-shaped antenna coil is desired, a sheet-like magnetic material having a high specific magnetic permeability, which is formed in a shape such as a fan or a square, is arranged in a manner extending from the magnetic flux-generating portion to the surface direction where increase of directivity is desired.

Then, a large portion of the magnetic flux from the magnetic flux-generating portion is guided by the sheet-like magnetic material having a high specific magnetic permeability to the surface direction (radius direction) and results to an expansion of communicable magnetic flux area in the outward surface direction. Owing to an expanding characteristic of the magnetic flux, the communicable magnetic flux area expands three-dimensionally, mainly to the extended outward surface direction.

Meanwhile, experiments revealed that the communicable magnetic flux area gradually shrinks in proportion to an extended distance when the sheet-like magnetic material is at the same time extended inward (e.g., a direction headed toward the diametral center of the antenna coil) from the magnetic flux-generating portion to the internal side of the antenna coil; further, when the sheet-like magnetic material is extended to the diametral center, the communicable magnetic flux area would shrink to a greater degree compared to a situation where the sheet-like magnetic material is not arranged at all.

Extending the sheet-like magnetic material in double sides in a surface direction of the concentric disk-shaped antenna coil is not desirable since an effect of the sheet-like magnetic material would be offset.

Accordingly, it is desirable to extend the sheet-like magnetic material arranged at the concentric disk-shaped antenna coil in a one side outward direction from the magnetic flux-generating portion, and if the sheet-like magnetic material is to be extended also in an inward direction at the same time, the distance of the inward extension should be restricted to a relatively short distance.

With a cylindrical antenna coil, the magnetic flux-generating portion exists at a tip portion of a core, and a magnetic flux passes through from the magnetic flux-generating portion to an axial direction and forms a loop heading toward a tip portion at an opposite side.

Accordingly, when an increase of directivity in an outward axial direction for the cylindrical antenna coil is desired, a sheet-like magnetic material is arranged in a manner extending from the magnetic flux-generating portion to the outward axial direction. Subsequently, a large portion of the magnetic flux from the magnetic flux-generating portion is guided to the outward axial direction by the sheet-like magnetic material with a high specific magnetic permeability, and a communicable magnetic flux area is thereby expanded in the axial direction.

The communicable area expands three-dimensionally in a direction mainly to the extended axial direction. Further, the communicable magnetic flux area starting from the tip portion of the opposite side to an outward axial direction would also expand substantially in the same manner, owing to an enlargement of the loop of the magnetic flux.

When the sheet-like magnetic material is at the same time extended from the magnetic flux generating portion to a center bound axial direction, the communicable magnetic flux area would gradually shrink, and would then rapidly shrink after exceeding a center point in an axial direction. Accordingly, the sheet-like magnetic material being arranged at the cylindrical antenna coil is desired to extend from the magnetic flux generating portion to an outward axial direction, and if the sheet-like magnetic material is to be extended in a center bound axial direction at the same time, the distance of the extension should be restricted to a relatively short distance.

A sheet-like magnetic material with a high specific magnetic permeability is employed in this invention. The term "high specific magnetic permeability" refers to a case where a magnetic permeability is higher than that of iron or other typical magnetic cores (e.g., although the magnetic permeability of a typical magnetic core such as ferrite has a specific magnetic permeability of a couple hundred, the magnetic material used in this invention has a high specific magnetic permeability no less than ten thousand). It is now to be noted that the specific magnetic permeability is a ratio between a magnetic permeability of the magnetic material and a magnetic permeability of vacuum.

It is desirable for an amorphous magnetic material shaped into a sheet form to be employed as the magnetic material with a high specific magnetic permeability. The magnetic permeability of the amorphous magnetic material typically has a specific magnetic permeability ranging from approximately thirty thousand through five hundred thousand.

For example, a magnetic material with a high specific magnetic permeability can exceedingly restrained attenuation of communicable magnetic flux even when an RFID tag serving as a communication device is attached closely to a conductive material such as metal since the magnetic flux subject for absorption by the conductive material can be effectively guided to the magnetic material with a high specific magnetic permeability.

Although an amorphous magnetic material is a representative material for a magnetic material with a high specific magnetic permeability, the present cost for a unit of an amorphous magnetic material is extremely costly. Accordingly, shaping an amorphous magnetic material into a sheet-like form can provide a remarkable expanding effect of communication distance without requiring much material and can also provide excellent advantages in cost.

For example, a suitable flexibility and practical strength of the sheet can be attained by forming a sheet-like magnetic material such as an amorphous magnetic material into a thickness of approximately 10 $\mu$m through 50 $\mu$m. Since a communication device such as an RFID tag are often arranged in small spaced areas, a sheet-like magnetic material having a flexible property can be used so that the sheet-like magnetic material being transformable can be bent and easily arranged in close proximity to an antenna coil.

Forming the magnetic material into sheet-like shape allows weight increase to be exceptionally small and also allows the weight thereof to be lightened, so that the magnetic material can be used for portable communication apparatus and the like.

Accordingly, in means to solve the aforementioned problems a communication device of this invention comprises an antenna coil, a sender/receiver circuit, a memory circuit, and a control circuit for non-contact electromagnetic wave communication with the external by using the antenna coil, wherein the antenna coil is formed into a flat concentric disk shape or a cylindrical shape by winding a coil to a core thereof, wherein a sheet-like magnetic material with a high specific magnetic permeability is arranged on one side of the antenna coil extending along the antenna coil from an intermediary portion between a diametral center of the antenna coil and an inner peripheral side to an outer area of one of the sides of the antenna coil in a case where the antenna coil has a concentric disk shape, and wherein a sheet-like magnetic material with a high specific magnetic permeability is arranged on one side of the core extending from a proximity of one of the tip end portions of the core to an outer area of the core in a case where the antenna coil has a cylindrical shape.

Thus structured, the magnetic material with a high specific magnetic permeability arranged in a manner extending from the magnetic flux generating portion formed at the antenna coil to an outward direction of the antenna coil can exceedingly restrain attenuation of magnetic flux for communication.

Accordingly, a magnetic material with a high specific magnetic permeability can exceedingly restrain attenuation of communicable magnetic flux even when an RFID tag serving as a communication device is attached closely to a conductive material such as metal since the magnetic flux subject for absorption by the conductive material can be effectively guided to the magnetic material with a high specific magnetic permeability. Subsequently, communication directivity for a prescribed direction can be heightened to allow expansion of communication distance.

An amorphous magnetic material shaped into a sheet-like form is desired to be employed as the sheet-like magnetic material with a high specific magnetic permeability.

The communication device can be applied to an RFID (Radio Frequency-IDentification) tag or a read/write device.

Housing the communication device inside a conductive container being separable into at least two portions, forming a magnetic flux leakage path at the separable portion of the container for leaking electromagnetic wave between the antenna coil and the external, and extending the sheet-like magnetic material from the antenna coil to the magnetic flux leakage path portion can make the communication device stronger against external stress or impact, can also allow the electromagnetic wave to leak through the magnetic flux leakage path formed at the separable portion of the container, and can also allow the sheet-like magnetic material extended from the antenna coil to the magnetic flux leakage path to exceedingly restrain reduction of magnetic flux for communication; thereby, the mutual send/receive operation of alternating magnetic field, which is a medium for electric power transmission and information communication, between the communication device and the external can be performed.

The communication device can be sealed into a sealed container made from a thin type non-conductive material, and the sheet-like magnetic material can be extended along an outer surface of the sealed container. Thus structured, the resin sealed communication device being sold and distributed in the market as a standard product can be used as is, and an inexpensive communication device having high reliability can be provided.

It is preferable for the container being separable into two portions to have a hinge mechanism formed on one side of an end portion thereof so that the two portions can be openable relative to each other.

The container can be formed into a card type by overlapping and joining two sheet-like members.

The communication device can be a metal nameplate enabling non-contact communication.

Another communication device of this invention comprises an antenna coil, a sender/receiver circuit, a memory circuit, and a control circuit for non-contact electromagnetic wave communication with the external by using the antenna coil, wherein the antenna coil is formed into a flat concentric disk shape, wherein the antenna coil is arranged between a primary sheet-like magnetic material with a high specific magnetic permeability and a secondary sheet-like magnetic material with a high specific magnetic permeability, and wherein the primary sheet-like magnetic material and the secondary sheet-like magnetic material are extended along the antenna coil from a center portion of the antenna coil to an outer area in opposite directions relative to each other.

Thus structure enables further heightening of directivity of the primary sheet-like magnetic material and the secondary sheet-like magnetic material being extended along the antenna coil from a center portion of the antenna coil to an outward and opposite direction relative to each other and also enables remarkable expansion of communication distance.

The primary sheet-like magnetic material and the secondary sheet-like magnetic material for the communication device can be made from a magnetic material with a high specific magnetic permeability such as an amorphous magnetic material to enable further expansion of communication distance.

The antenna coil, the sender/receiver circuit, the memory circuit, and the control circuit can be housed inside a non-conductive sealed container, and the primary sheet-like magnetic material and the secondary sheet-like magnetic material can be arranged having the sealed container therebetween.

The primary sheet-like magnetic material and the secondary sheet-like magnetic material can entirely be housed inside a thin-type container which leaks magnetic flux. Accordingly, the communication device can be protected from physical or chemical influence from the external or influence from flooding during storage, transportation and use, can perform excellent communication, and can have a remarkable appearance.

The container can have at least one surface portion thereof being made from aluminum or an alloy of aluminum. Thus structured, the communication device can have an enhanced physical strength and can be used as a long-lasting nameplate.

With an installation structure for the communication device according to claim 1, the communication device can be installed on a surface of a conductive installing object or installed inside an installment groove portion arranged at the surface of the conductive installing object.

Thus structured, the sheet-like magnetic material with a high specific magnetic permeability being arranged extending from a magnetic flux generating portion of the antenna coil to an outer area of the antenna coil can allow a magnetic flux targeted for absorption by the conductive material to be effectively guided to the sheet-like magnetic material with a high specific magnetic permeability so that attenuation of a communicable magnetic flux can be exceedingly restrained even when the communication device is attached to a conductive installing object.

Since the sheet-like magnetic material can be of a flexible nature, the sheet-like magnetic material can be bent or transformed into a suitable shape when placing an RFID tag in a small area.

A manufacturing method for a communication device of this invention is a method for manufacturing a communication device comprising an antenna coil, a sender/receiver circuit, a memory circuit, and a control circuit for non-contact electromagnetic wave communication with the external by using the antenna coil, wherein the antenna coil is formed into a flat concentric disk shape or a cylindrical shape by winding a coil to a core thereof, wherein the antenna coil, the sender/receiver circuit, the memory circuit, and the control circuit are housed inside a non-conductive sealed container, wherein the sealed container is plurally arranged in a prescribed interval along a longitudinal direction of a thin long primary sheet material, wherein a sheet-like magnetic material with a high magnetic permeability is plurally arranged in a prescribed interval along a longitudinal direction of a thin long secondary sheet material, wherein each container body and each sheet-like magnetic material are postionally adjusted relative to each other, in which the sheet-like magnetic materials are positionally adjusted to be arranged on one side of the antenna coil extending along the antenna coil from an intermediary portion between a diametral center of the antenna coil and an inner peripheral side to an outer area of one of the sides of the antenna coil in a case where the antenna coil has a concentric disk shape, and the sheet-like magnetic materials are positionally adjusted to be arranged on one side of the core extending from a proximity of one of the tip end portions of the core to an outer area of the core in a case where the antenna coil has a cylindrical shape, wherein the primary sheet material and the secondary sheet material are joined to each other, and wherein each combined body of the container body and the sheet-like magnetic material is divided.

With the foregoing method, the communication device can be manufactured efficiently and inexpensively. Furthermore, each communication device can be easily separated at the dividing portion.

The primary sheet material and the secondary sheet material having the communication device and the sheet-like magnetic material arranged therebetween allows the communication device and the sheet-like magnetic material to maintain a steady position relative to each other so that directivity or the like can be steady.

The primary sheet material and the secondary sheet material being bonded to each other can have the communication device and the sheet-like magnetic material sealed therein to provide functions such as a water resistance or gas resistance.

The communication device can be easily manufactured without effort since each sheet-like magnetic material is simply placed on a side serving as the top surface of the antenna coil. Since the sheet-like magnetic material is not required to be inserted into the antenna coil as in the conventional example, the communication device can have a simple structure and can be free from a danger of the sheet-like magnetic material damaging the antenna coil.

The primary sheet material and the secondary sheet material being employed with conductive material have a magnetic flux leakage path between the external and the internal formed at a bonding rim portion thereof, in which the sheet-like magnetic material is extended to a portion of the magnetic flux leakage path; thereby, information memorized into the memory device of the communication device through electromagnetic wave leaking from the magnetic flux leakage path can be read out by the magnetic flux from the external.

A communication method of this invention is a method of communication with a communication device comprising an antenna coil, a sender/receiver circuit, a memory circuit, and a control circuit for non-contact electromagnetic wave communication with the external by using the antenna coil, wherein the communication device has the antenna coil being formed into a flat concentric disk shape or a cylindrical shape by winding a coil to a core thereof, wherein the communication device has a sheet-like magnetic material with a high specific magnetic permeability being arranged on one side of the antenna coil extending along the antenna coil from an intermediary portion between a diametral center of the antenna coil and an inner peripheral side to an outer area on one of the sides of the antenna coil in a case where the antenna coil has a concentric disk shape, wherein the communication device has a sheet-like magnetic material with a high specific magnetic permeability being arranged on one side of the core extending from a proximity of one of the tip end portions of the core to an outer area of the core in a case where the antenna coil has a cylindrical shape, and wherein non-contact electromagnetic wave communication with the external is performed in a state where directivity of the antenna coil is heightened by the sheet-like magnetic material.

Another communication method of this invention is a method of communication with a communication device comprising an antenna coil, a sender/receiver circuit, a memory circuit, and a control circuit for non-contact electromagnetic wave communication with the external by using the antenna coil, wherein the communication device has the antenna coil being formed into a flat concentric disk shape and being arranged between a primary sheet-like magnetic material with a high specific magnetic permeability and a secondary sheet-like magnetic material with a high specific magnetic permeability, wherein the primary sheet-like magnetic material and the secondary sheet-like magnetic material are extended along the antenna coil from a center portion of the antenna coil to an outer area in opposite directions relative to each other, wherein the primary sheet-like magnetic material and the secondary sheet-like magnetic material are arranged overlapping each other at a center portion of the antenna coil, and wherein non-contact electromagnetic wave communication with the external is performed in a state where directivity of the antenna coil is heightened by the sheet-like magnetic material.

With the foregoing communication method, the sheet-like magnetic material with a high specific magnetic permeability being arranged extending from a magnetic flux generating portion of the antenna coil to an outward direction of the antenna coil allows the attenuation of a communicable magnetic flux to be exceedingly restrained, and allows information memorized into the memory device of the communication device to be read out by the magnetic flux from the external.

Furthermore, directivity can increase in an extending direction of the sheet-like magnetic material with a high specific magnetic permeability to thereby enhance communication sensitivity.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIG. 3 shows a state of a structure of an RFID tag having a concentric disk-shaped antenna coil and a magnetic field created at the antenna coil;

FIGS. 25(a) and (b) respectively show a side view and a plane view of a state where a plurality of RFID tags having cylindrical antenna coils are arranged at a prescribed interval in a fixedly adherent manner to primary sheet materials;

FIGS. 26(a) and (b) respectively show a side view and a plane view of a state where a square-like sheet-like magnetic material is arranged at a prescribed interval in a fixedly adherent manner to a secondary sheet material;

BEST MODE FOR THE INVENTION

An embodiment of this invention regarding a communication device and an installment structure of the communication device, a manufacturing method of the communication device and an communication method with the communication device will hereinafter be described in detail with reference to the drawings. As one example of a proposed structure of a communication device 12, a structure of an RFID tag 1a having a flat concentric disk-shaped antenna coil 2a will hereinafter be described with reference to FIG. 1 through FIG. 4. The RFID tag 1a preferably applicable to this embodiment relate both to those of electromagnetic coupling type and electromagnetic induction type although the description below specifically deals with the latter type.

Figure 1:
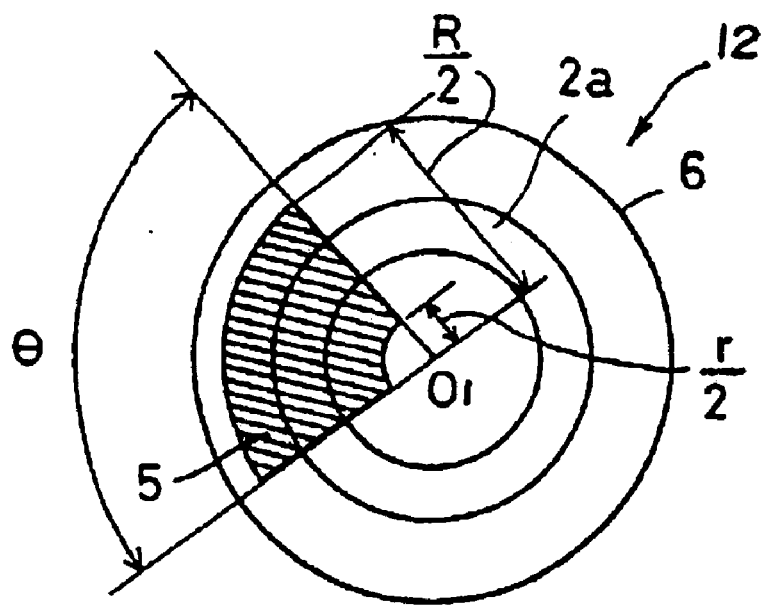
FIGS. 1(a) and 1(b) are a plane view and a cross-sectional view showing one example of a communication device regarding this invention where a sheet-like magnetic material is arranged to an RFID tag having a concentric disk-shaped antenna coil.
Figure 1:
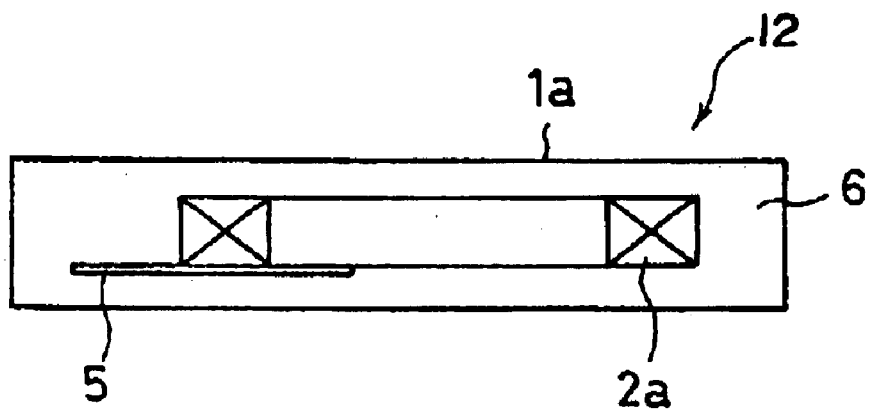
Figure 2:
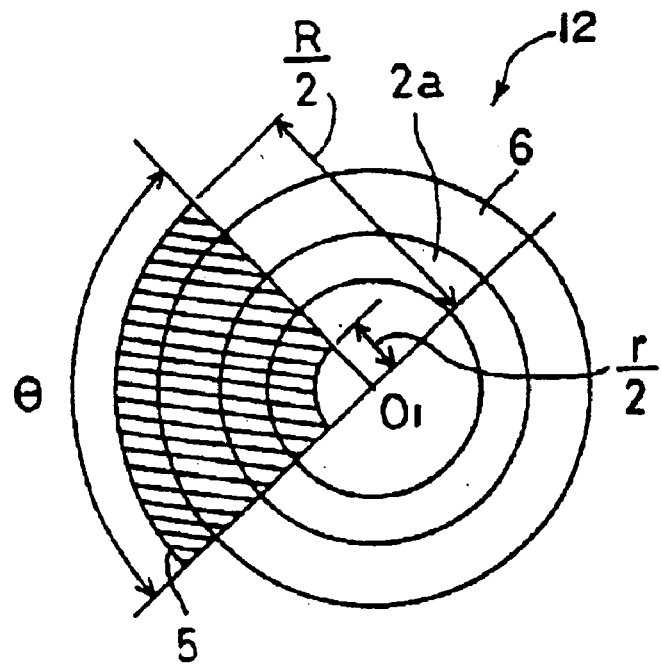
FIGS. 2(a) and 2(b) are a plane view and a cross-sectional view showing one example of a communication device regarding this invention where a sheet-like magnetic material is arranged to an RFID tag having a concentric disk-shaped antenna coil.
Figure 2:
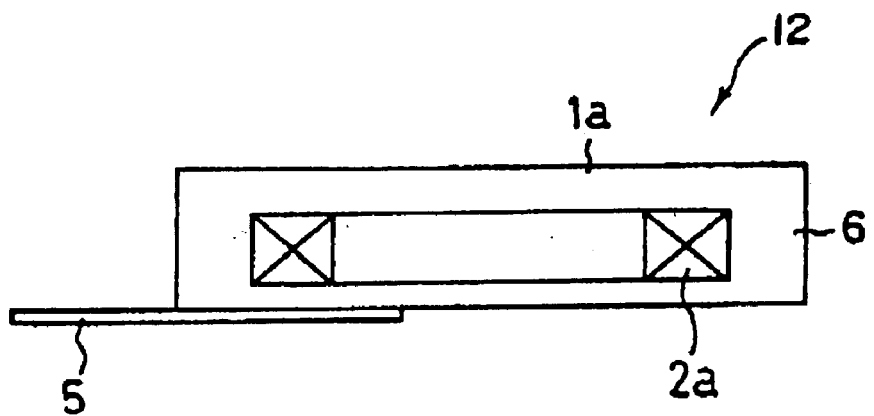

The RFID tag 1a shown in FIG. 1 through FIG. 3 is one example of a communication device 12 for communicating with electromagnetic wave by using the antenna coil 2a; the RFID tag 1a has a flat concentric disk-shaped antenna coil 2a and a semiconductor IC chip 4 serving as a control section comprised of a control circuit, both of which being directly connected with each other without interfaced by a printed circuit board or the like, which successfully results in size reduction of the RFID tag 1a.

Figure 4:
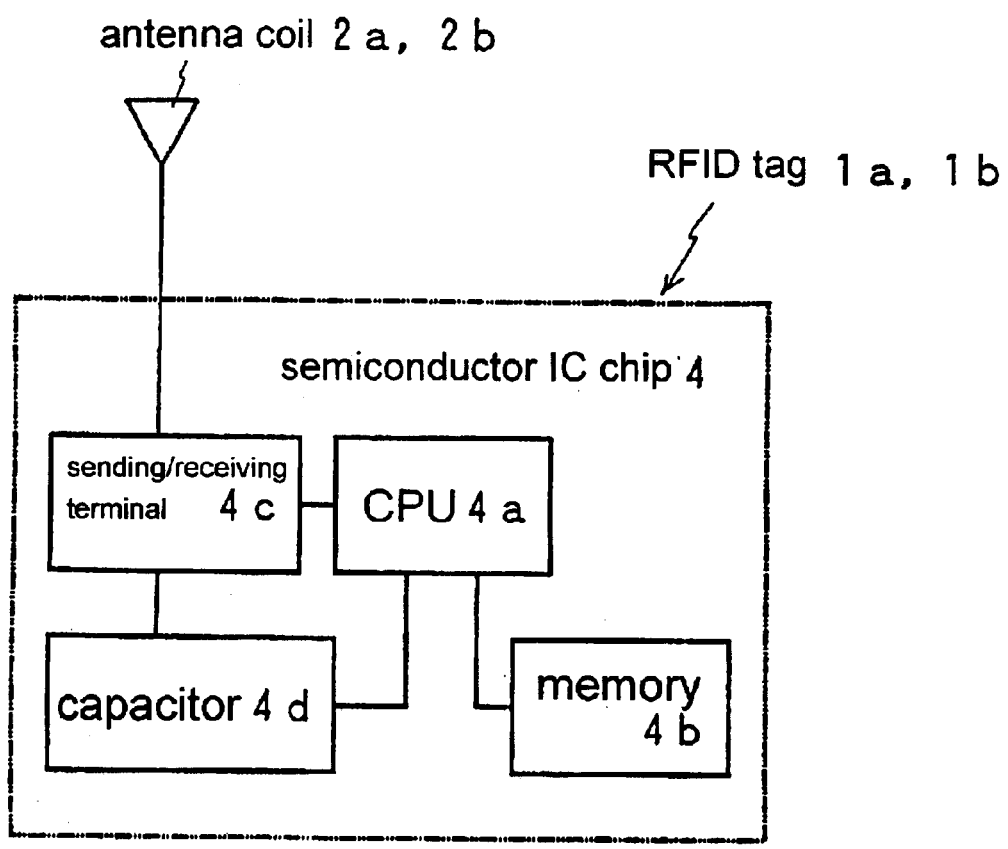
FIG. 4 is a block diagram of a structure of control system of an RFID tag.

The semiconductor IC chip 4 comprises an IC (integrated circuit) chip or an LSI (large-scale integrated circuit) chip packaged in an integrated manner, and such semiconductor IC chip 4 has incorporated therein a CPU (central processing unit) 4a serving as a control section comprised of a control circuit, a memory 4b serving as a memory section comprised of a memory circuit, a sender/receiver 4c comprised of a sender/receiver circuit and a capacitor 4d serving as a power storage means, as shown in FIG. 4.

A signal sent from an external read/write device (not shown), is received by the sender/receiver 4c, transmitted to the CPU 4a and converted into electric power to be stored in the capacitor 4d. It is now also allowable to omit the capacitor 4d serving as a power storage means, and instead continuously supply electric power from the external read/write device to the semiconductor IC chip 4.

The CPU 4a is responsible for reading out programs or various data stored in the memory 4b and for performing necessary operations and decision, to thereby enable various controls.

The memory 4b contains various programs for allowing operation of the CPU 4a, and various information to which the RFID tag 1a is provided.

As a typical example of the concentric disk-shaped antenna coil 2a shown in FIG. 3, a single copper wire having a diameter of approx. 30 μm is wound in a stacked form in the radial direction and in a concentric disk-shaped form; where an inductance of such antenna coil 2a was approx. 9.5 mH (at 125 kHz), and an electrostatic capacity of a capacitor connected for resonation to the antenna coil 2 was approx. 170 pF (at 125 kHz).

The RFID tag 1a of this embodiment being based on the single-wavelength amplitude shift keying (ASK) has a wide resonance frequency range, has an air core antenna coil 2a having a wire diameter as small as several tens micrometers, and has a CMOS-IC of extremely small electric power consumption having a specific send/receive circuit incorporated therein.

Conventionally, since the change of a magnetic field passing through an antenna coil installed in an electromagnetic coupling type RFID tag and an induction type RFID tag enables the RFID tags to receive electric power and to send/receive signals, there was a fixed idea that a conductive material such as a magnetic material (which creates an eddy current from the magnetic field during transmittal of electric power or communication of the RFID tag to adversely affect communication) or a metal material being arranged near an RFID tag attenuates the magnetic field and prevents operation. Accordingly, it was common sense to remove magnetic material or metal objects away from an RFID tag, and attachment to a metal container or to a metal object has not been attempted before.

Under the technical background that arranging a conductive material near an RFID tag causes the conductive material to attenuate the magnetic field and disable the RFID tag, the inventors of this invention, in a means to put an RFID tag into effective use for a conductive material such as a magnetic material or metal, have found out through intensive research and experimentation that magnetic flux can be effectively induced and electromagnetic communication with the external can be performed even when an RFID tag is attached to a conductive material as long as a sheet-like magnetic material having a high specific magnetic permeability is arranged extending from a magnetic flux-generating portion formed at an antenna coil of the RFID tag to a direction extending outward of the antenna coil, thereby, allowing the RFID tag to be used effectively in relation to the conductive material.

An RFID tag receives an alternating magnetic field sent from an external read/write device through resonance frequency of the antenna coil installed within the RFID tag. The conventional RFID tag being based on a frequency shift keying (FSK) for expanding communication distance using two waves (e.g. 125 kHz and 117 kHz) uses a ferrite core upon the antenna coil for increasing received electric power and expands communication distance by widening a wire diameter of the antenna coil and then coiling the antenna coil into a plurally coiled form.

In a case where a conductive material such as a metal or a magnetic material is placed in a vicinity of the RFID tag, using the two-wave frequency shift keying (FSK) type raised a problem of frequency shifting and resulted to reduction of received electric power, and also raised a problem of communication error to disable communication and resulted to an extreme decrease in communication distance; accordingly, there was a fixed idea that attaching and using a RFID tag upon a conductive material such as a metal or a magnetic material was practically impossible.

Nevertheless, the recent RFID tag being based on a single-wave length amplitude shift keying (ASK) has a wide resonance frequency range, has an antenna coil having a wire diameter as small as several tens micrometers, and has a CMOS-IC of extremely small electric power consumption having a specific send/receive circuit incorporated therein.

Experimental results obtained by the present inventors revealed that communication using an RFID tag based on the ASK system is less sensitive to frequency shifting and is hardly affected by a conductive material placed in the vicinity thereof, since such RFID tag 1a has a wider resonance frequency range as compared with that of the tag based on the FSK system and will not cause reduction in received electric power.

Further, experimental results obtained by the present inventors revealed that magnetic field could transmit even through a narrow opening owing to a diffraction phenomenon, and further revealed that an alternating magnetic field serving as an electric power conveying medium and an information transmitting medium could be sent/received between the RFID tag and an external read/write device even when the RFID tag is surrounded by a conductive material by forming a magnetic flux leakage path (being a bonding surface between separated conductive materials or a contacting surface of screw portion; or a physical slight opening such as a slit, a notch, or a physical slight opening) so as to allow leakage of magnetic flux for sending/receiving at a practical level.

In FIG. 1, a sheet-like amorphous magnetic material 5 serving as a sheet-like magnetic material having a high specific magnetic permeability is arranged on one side at a bottom side of the concentric disk-shaped antenna coil 2$a$ in a manner extending along the antenna coil 2$a$ from an intermediary portion between a diametral center of the antenna coil 2$a$ and a inner peripheral portion of the antenna coil 2$a$ to a direction outward of one of the ends of the antenna coil 2$a$, in which the sheet-like amorphous magnetic material 5 and the RFID tag 1$a$ including the antenna coil 2$a$ are sealed by a resin 6 in an integrated manner.

In FIG. 2, the RFID tag 1$a$ including the antenna coil 2$a$ is sealed by the resin 6 and the sheet-like amorphous magnetic material 5 is arranged on one side at a bottom side of a case made from the resin 6 in a manner extending along the antenna coil 2$a$ from an intermediary portion between the diametral center of the antenna coil 2$a$ and the inner peripheral portion of the antenna coil 2$a$ to a direction outward of one of the ends of the antenna coil 2$a$.

Figure 5:
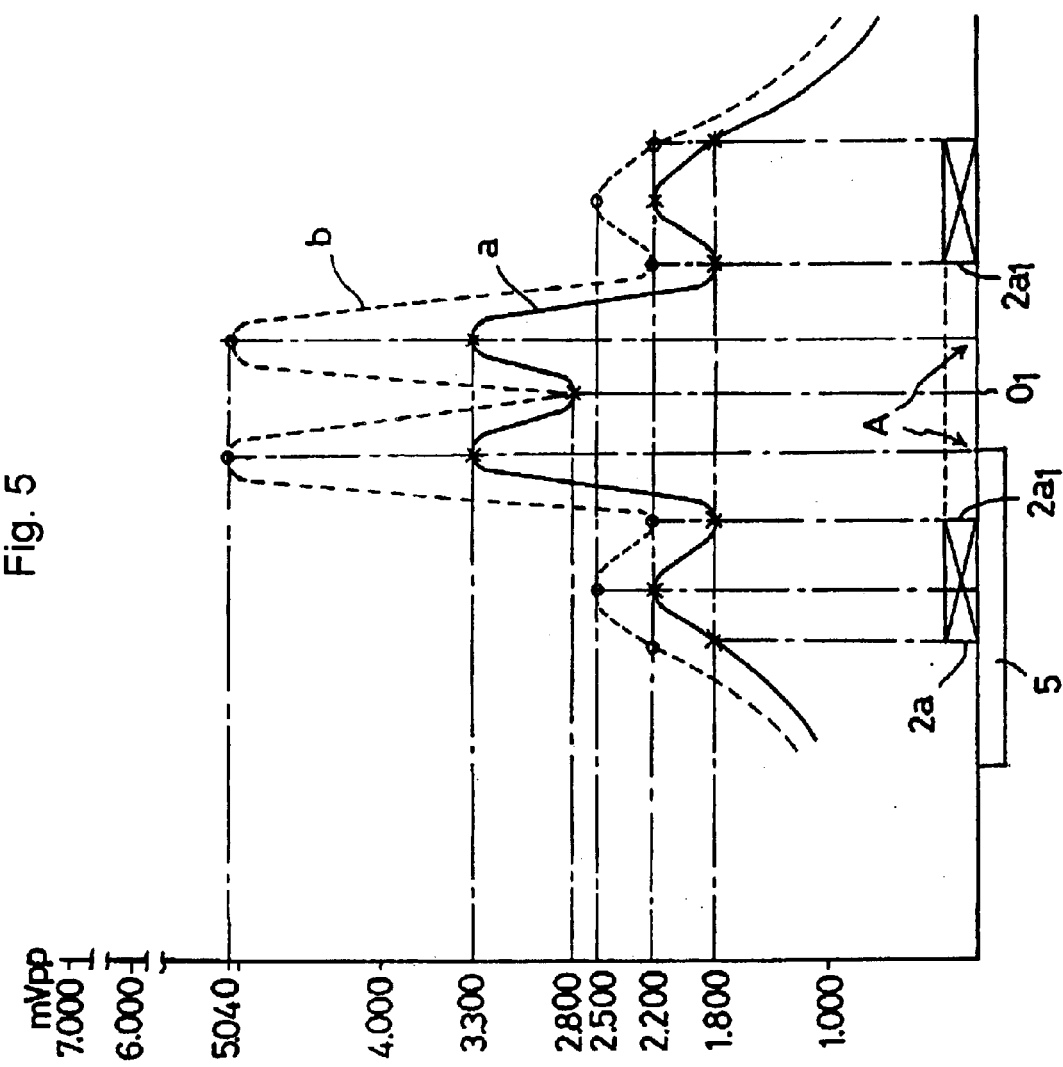
FIG. 5 is a diagram for comparing an electric field characteristic of a magnetic flux created from a concentric disk-shaped antenna coil of the communication device regarding this invention between when there is a sheet-like magnetic material and when there is no sheet-like magnetic material.
Figure 6:
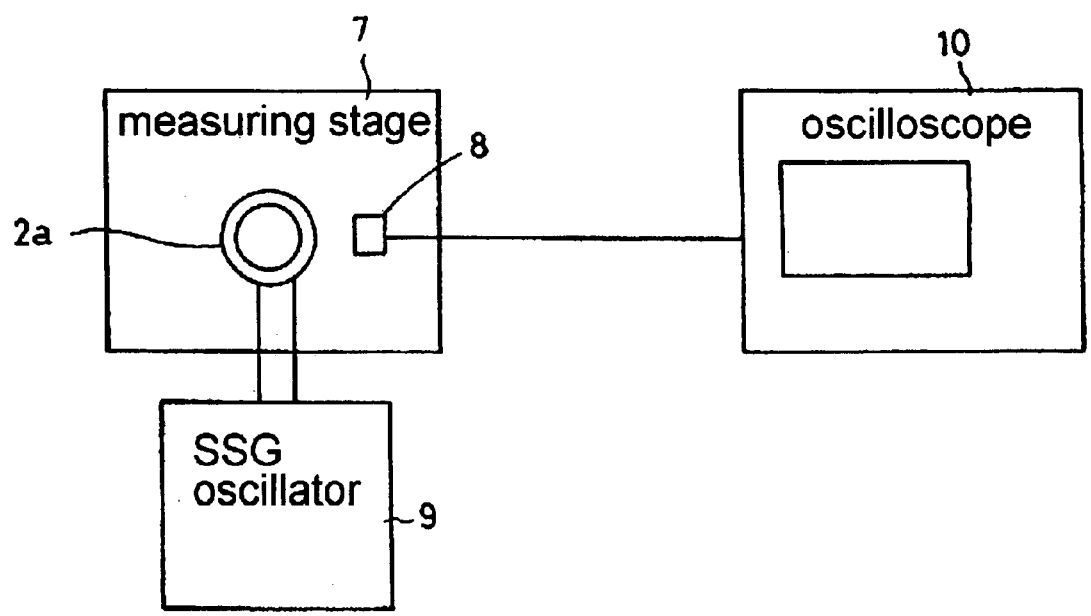
FIG. 6 is a schematic structural view of an experiment device for measuring an electromagnetic field.

FIG. 5 shows a result from a measuring method in FIG. 6 for measuring the induction of an electric field characteristic (magnetic flux density characteristic) in relation to each portion of the RFID tag 1$a$ when an electromagnetic wave (magnetic flux) from the external is applied upon the RFID tag 1$a$ having the concentric disk-shaped antenna coil 2$a$, in which a curving line a (indicated with a solid line in FIG. 5) is the electric field characteristic when a sheet-like amorphous magnetic material 5 is not arranged, and a curving line b (indicated with a broken line in FIG. 5) is the electric field characteristic when a sheet-like amorphous magnetic material 5 is arranged.

Having the diametral center $o_1$ of the antenna coil 2$a$ serve as the center, the curving line b expediently describes an over-all electric-field characteristic, wherein the curving line b at the left side of FIG. 5 indicates a case where the sheet-like amorphous magnetic material 5 is arranged at the left side of the antenna coil 2$a$, and the curving line b at the right side of FIG. 5 indicates a case where the sheet-like amorphous magnetic material 5 is arranged at the right side of the antenna coil 2$a$. In an actual case, the curving line b would appear only on one of the either sides of FIG. 5.

The curving line b shown in FIG. 5 indicates that the peak value of the electric-field characteristic and sensitivity become higher when the sheet-like amorphous magnetic material 5 is arranged extending from the magnetic flux generating portion A of the antenna coil 2$a$ to an outward direction of the antenna coil 2$a$.

In the concentric disk-shaped antenna coil 2$a$, the magnetic flux generating portion A having the peak of the electric-field characteristic appearing thereat exists at an intermediary portion substantially between the diametral center $o_1$ of the antenna coil and the inner peripheral portion 2$a$1 of the antenna coil 2$a$, in which magnetic flux generating portion A has the sheet-like amorphous magnetic material 5 extending therefrom to a direction outward of the antenna coil 2$a$.

As indicated with the curving lines a, b of FIG. 5, the magnetic flux generating portion A would not shift with or without the sheet-like amorphous magnetic material 5.

In employing an electric-field characteristic measuring device shown in FIG. 6, a concentric disk-shaped antenna coil 2$a$ of a World Disk Tag series made from Sokymat Inc. is arranged upon a measuring stage 7, and an SSG oscillator 9 (Kenwood FG-273 Ser.7020087) is electrically connected to both portions of the antenna coil 2$a$, and a sinusoidal wave output having a frequency of 125 kHz, 12 Vpp (voltage amplitude from one peak to the other peak being 12V) is applied.

As a means for measuring electric field strength generated at the periphery of the antenna coil 2$a$, a pick up coil 8 is employed. The employed pick-up coil 8 is tuned to 125 kHz from a 1 mH open magnetic type inductor and a 1591 pF tuning ceramic condenser is employed as the pick up coil.

Subsequently, a probe of an oscilloscope 10 (Sony-Tektronix TDS34 OAP Ser.J300635) is electrically connected to both sides of the pick-up coil 8; upon the measuring stage 7, the pick-up coil is plotted every concentric 5 mm from the diametral center o1 along an X-Y plane and an X-Z plane, and then, the electric voltage value inducted to the pick-up coil 8 from one peak to the other peak is measured.

FIG. 5 shows the electric-field characteristic of the RFID tag 1$a$ having a concentric disk-shaped antenna coil 2$a$ measured at each position of the RFID tag 1$a$, in which the electric field being measured at the electric voltage peak is in proportion to the magnetic flux generated at the electric voltage peak and the magnetic flux generating portion A exists at an intermediary portion between the diametral center $o_1$ of the antenna coil 2$a$ and the inner peripheral portion 2$a$1 of the antenna coil 2$a$.

It is now to be noted that a relative amount of sensitivity can be obtained at an intermediary portion between the inner peripheral portion 2$a$1 of the antenna coil 2$a$ and the outer peripheral portion of the antenna coil 2$a$. Therefore, the sheet-like amorphous magnetic material 5 can be arranged extending from a radial intermediary portion of the antenna coil 2$a$ to an outward direction of the antenna coil 2$a$ in a case where a slight decrease in communication sensitivity is permissible. Thereby, the required amount of the sheet-like amorphous magnetic material can be reduced. The sheet-like amorphous magnetic material 5 can also be shaped as a fan or a square whether or not the decrease in communication sensitivity is permissible.

The sheet-like amorphous magnetic material 5 is an amorphous alloy formed in a sheet-like shape, in which the amorphous alloy is typically formed as a tenacious foil body by means of a super quenching method. The sheet-like amorphous magnetic material 5 has the characteristics such as having a high magnetic permeability; having a low coercive force; having a low iron loss; having a low hysteresis loss; having a low eddy current; being capable of widely controlling magnetic distortion; having a high electricity resistance; having little variation in temperature; having a low thermal expansion coefficient; and having little variation in rigidity.

An amorphous magnetic material generally has an extremely high specific magnetic permeability ranging from several ten thousands to several millions. For example, a sheet-like magnetic material of Fe—Ni—Mo—B—S system being sold in the market by Allied Chemical Corporation (U.S.A.) has a specific magnetic permeability of 800 thousand; further, a sheet-like amorphous magnetic material having a similar composition and a high specific magnetic permeability is sold in the market by Hitachi Kinzoku K. K.; and both could be employed for the present invention.

The amorphous alloy could be formed in a flake-like shape. This flake-like amorphous alloy is formed in a sheet-like shape such as "amorsic sheet" (name of product) manufactured by Riken K. K.

This amorsic sheet has cobalt amorphous alloy flakes with a high specific magnetic permeability shaped as bamboo leaves being uniformly scattered upon an insulated film and being fixed thereto in a sandwiched manner.

Further, the flake-shaped amorphous magnetic materials being in a scattered state can be molded into a sheet-like form to allow being used as a magnetic protective sheet.

As shown in FIG. 1 and FIG. 2, the sheet-like amorphous magnetic material 5 is formed in a shape of a fan and is arranged in a manner extending from the magnetic flux generating portion A to an outward direction of the antenna coil 2a. The angle of the fan θ is desirable to be approximately 90 degrees and the degree is desirable to be ranged between 60 degrees through 180 degrees from a practical aspect.

Figure 7:
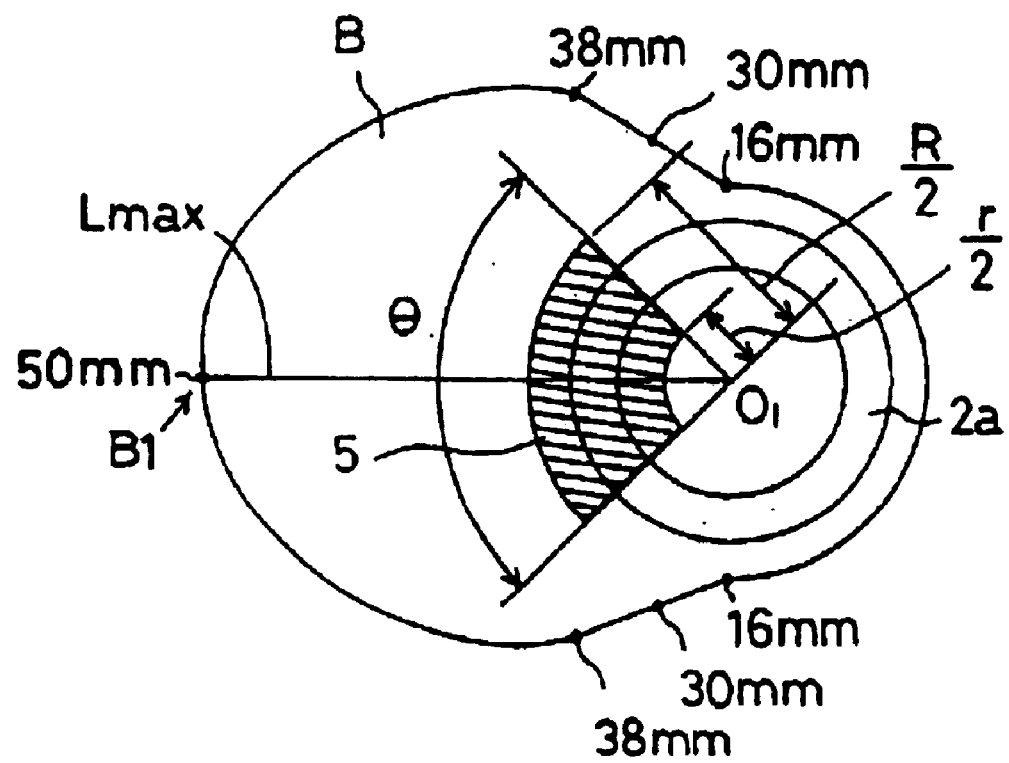
FIG. 7 shows an experiment result of a communicable magnetic flux area (communicable maximum distance) in a surface direction of an antenna coil regarding the RFID tag shown in FIG. 2.

FIG. 7 shows the measured result of the communicable magnetic flux area (maximum communication distance $L_{max}$) in a surface direction (lateral direction of FIG. 2(b)) of the antenna coil 2a of the RFID tag 1a, in a case where the fan-shaped sheet-like amorphous magnetic material 5 of FIG. 2 having an angle θ of 90 degrees is arranged below the RFID tag 1a having the concentric disk-shaped antenna coil 2a and is arranged on top of a stainless steel sheet serving as a conductive material (not shown), and where the RFID tag 1a sealed by the resin 6 is placed upon the sheet-like amorphous magnetic material 5.

In FIG. 7, a Fe—Ni—Mo—B—S system having a maximum magnetic permeability μ of 800000 manufactured by Allied Signal Inc. is employed as the sheet-like amorphous magnetic material wherein the diameter regarding the outer diameter of the concentric disk-shaped antenna coil 2a is 25 mm and the inner diameter thereof is 20 mm; the diameter regarding the outer diameter of the fan-shaped sheet-like amorphous magnetic material 5 is 80 mm and the inner diameter thereof is 10 mm; and the thickness of the sheet-like amorphous magnetic material 5 is 30 μm.

In FIG. 7, a communicable magnetic flux area B appears at an outer side of the sheet-like amorphous magnetic material 5 in a shape similar to the fan shape of the sheet-like amorphous magnetic material 5 in which a maximum point $B_1$ being the maximum communication distance $L_{max}$ is extended 50 mm from the diametral center $o_1$ of the antenna coil 2a to a direction of the sheet-like amorphous magnetic material 5.

It should now be noted that under the same conditions, the maximum communication distance $L_{max}$ is 27 mm when the antenna coil 2a is placed upon the stainless steel sheet without the sheet-like amorphous magnetic material 5; the maximum communication distance $L_{max}$ is 25 mm when the sheet-like amorphous magnetic material 5 is arranged entirely across the coil surface of the antenna coil 2a and placed upon the stainless steel sheet; and the maximum communication distance $L_{max}$ is 24 mm when a donut-shaped sheet-like amorphous magnetic material 5 is arranged entirely across the bottom surface of the antenna coil 2a and placed upon the stainless steel sheet.

Accordingly it has been revealed that the maximum communication distance $L_{max}$ would be greater when the sheet-like amorphous magnetic material 5 is arranged in a manner extending from the magnetic flux generating portion A formed at the antenna coil 2a and extending to an outward direction of the antenna coil 2a (as shown in FIG. 1, FIG. 2, FIG. 5 and FIG. 7) compared to when there is no sheet-like amorphous magnetic material 5 or when the sheet-like amorphous magnetic material 5 is arranged entirely across the antenna coil 2a.

Figure 8:
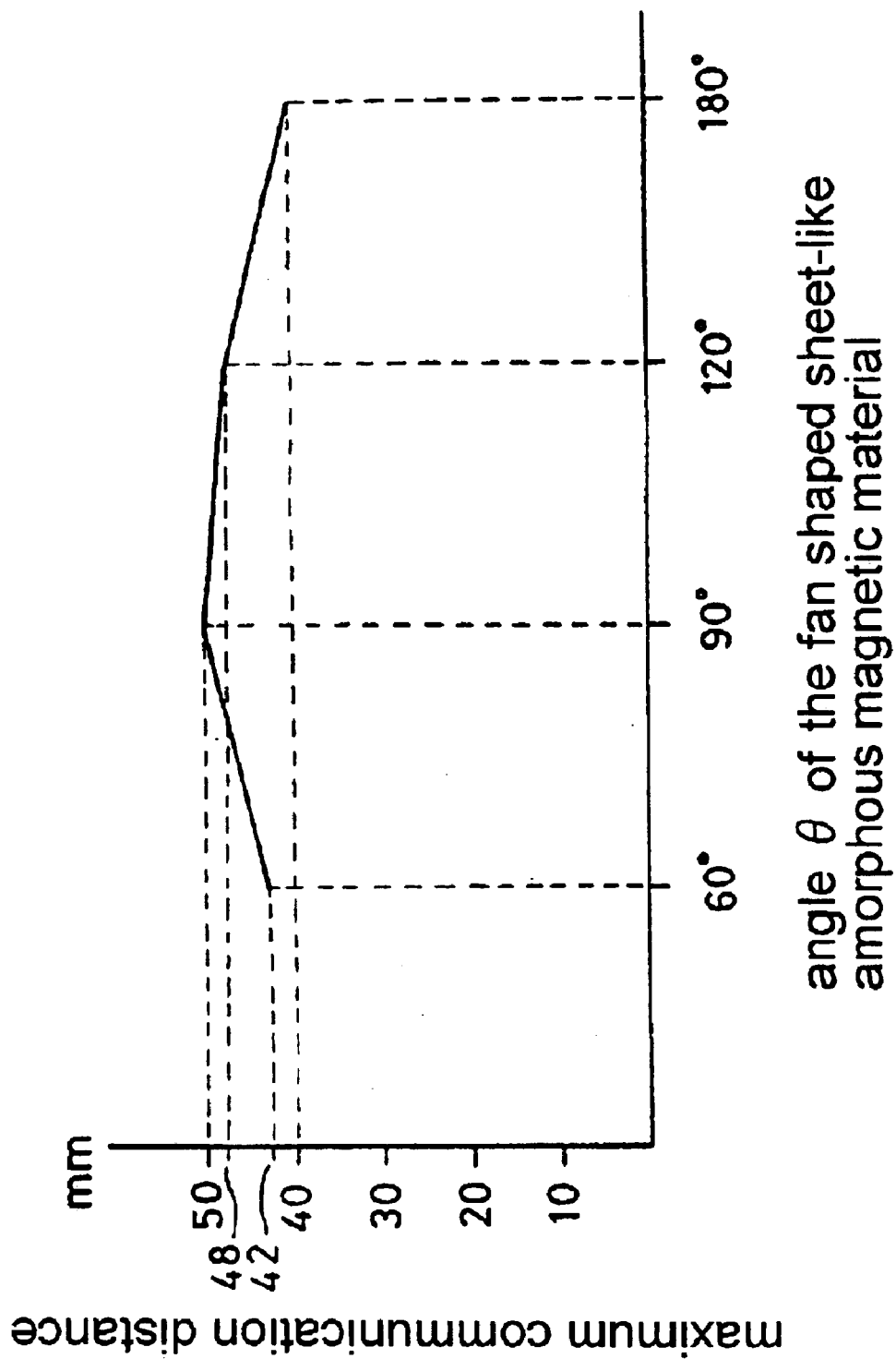
FIG. 8 shows an experiment result of a relation between a width (angle) of a sheet-like magnetic material and a communicable magnetic flux area (communicable maximum distance) in a surface direction of an antenna coil.

FIG. 8 shows a measured result regarding a transition of the maximum communication distance $L_{max}$ of maximum point $B_1$ when the angle θ of the fan shaped sheet-like amorphous magnetic material 5 placed upon the stainless steel sheet (shown in FIG. 7) is altered from 60 degrees through 180 degrees.

The maximum communication distance $L_{max}$ from the diametral center $o_1$ of the antenna coil 2a to the maximum point $B_1$ is 42 mm when the angle θ of the fan shaped sheet-like amorphous magnetic material 5 is 60 degrees; corresponding with the increase of angle θ from 60 degrees through to 90 degrees, the maximum communication distance $L_{max}$ of maximum point $B_1$ expands gradually; and when the angle θ reaches 90 degrees, the maximum communication distance $L_{max}$ transits to a maximum of 50 mm.

Further, corresponding with the increase of angle θ from 90 degrees to 180 degrees, the maximum communication distance $L_{max}$ of maximum point $B_1$ shrinks gradually; the maximum communication distance $L_{max}$ was 48 mm in an angle θ of 120 degrees; and the maximum communication distance $L_{max}$ was 40 mm in an angle θ of 180 degrees.

Accordingly, results of the experiments reveal that the most suitable angle for the fan-shaped sheet-like amorphous magnetic material θ is 90 degrees; and when the angle θ is ranged between 60 degrees and 180 degrees, the maximum communication distance $L_{max}$ would be greater when the sheet-like amorphous magnetic material 5 is arranged in a manner extending from the magnetic flux generating portion A formed at the antenna coil 2 to an outward direction of the antenna coil 2a, compared to when there is no sheet-like amorphous magnetic material 5 or when the antenna coil 2a is arranged entirely upon the sheet-like amorphous magnetic material 5.

Figure 9:
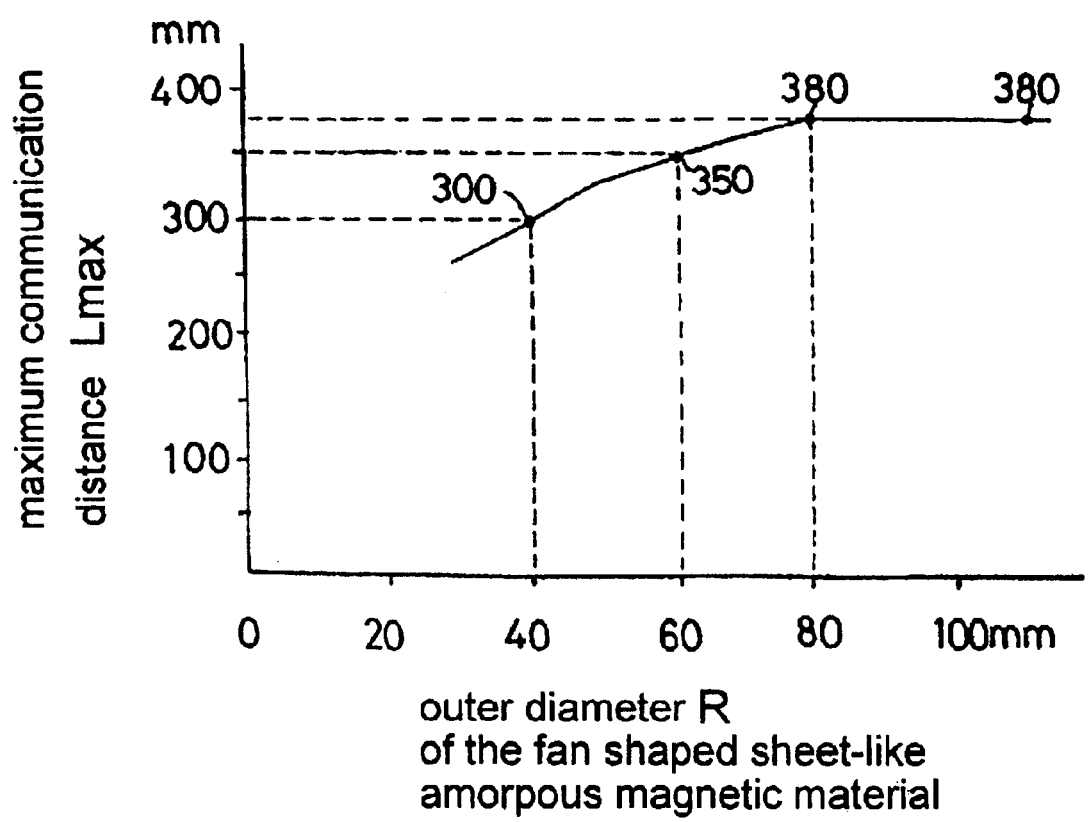
FIG. 9 shows an experiment result of a relation between an extension length (outer diameter) of a sheet-like magnetic material and a communicable magnetic flux area (communicable maximum distance) in a surface direction of an antenna coil.

FIG. 9 is a diagram showing the relation between an outer diameter R of the fan shaped sheet-like amorphous magnetic material (extending length) and the maximum communication distance $L_{max}$, wherein an sheet-like amorphous magnetic material manufactured by Allied Signal Inc. U.S.A (an Fe—Ni—Mo—B—S system having a maximum magnetic permeability μ of 800000, an outer diameter of the antenna coil 2a being 25 mm, an inner diameter of the antenna coil 2a being 20 mm, the thickness of the sheet-like amorphous magnetic material 5 being 30 μm) is employed, wherein the relation between the outer diameter R and the maximum communication distance $L_{max}$ is measured by changing the outer diameter R of the fan shaped sheet-like amorphous magnetic material when the inner diameter of the fan-shape r is 10 mm and the angle θ of the fan-shape is 90 degrees in a state where the antenna coil is placed on the stainless steel sheet.

The maximum communication distance $L_{max}$ of maximum point $B_1$ is 300 mm when the outer diameter R of the fan shaped sheet-like amorphous magnetic material 5 is 40 mm; the maximum communication distance $L_{max}$ of maximum point $B_1$ expands gradually between the range from 40 mm through 80 mm; the maximum communication distance $L_{max}$ of maximum point $B_1$ is 350 mm when the outer diameter R of the fan shaped sheet-like amorphous magnetic material 5 is 60 mm; and when the outer diameter R reaches 80 mm, the maximum communication distance $L_{max}$ transits to a maximum of 380 mm.

When the outer diameter becomes 80 mm or more, the maximum communication distance $L_{max}$ would saturate to maintain a distance of 380 mm. Accordingly, the most suitable length for the outer diameter R of the fan-shaped sheet-like amorphous magnetic material is 80 mm, and therefore, a length exceeding 80 mm would cause material cost to become costly and wasteful.

In a same manner as FIG. 9, in a case where the sheet-like amorphous magnetic material 5 and the antenna coil 2a are placed upon an aluminum sheet or a copper sheet serving as a conductive member instead of the stainless steel sheet, the maximum communication distance $L_{max}$ was 230 mm when the outer diameter R of the fan shaped sheet-like amorphous magnetic material 5 was 80 mm or more. Further, the maximum communication distance $L_{max}$ was 200 mm in a case where there was neither conductive material nor a use of the sheet-like amorphous magnetic material 5.

Accordingly, it is revealed that the maximum communication distance $L_{max}$ would be greater when the antenna coil 2a is placed upon a conductive material such as a stainless steel sheet, an aluminum sheet or a copper sheet via the sheet-like amorphous magnetic material 5 compared to when there is no conductive material.

Figure 10:
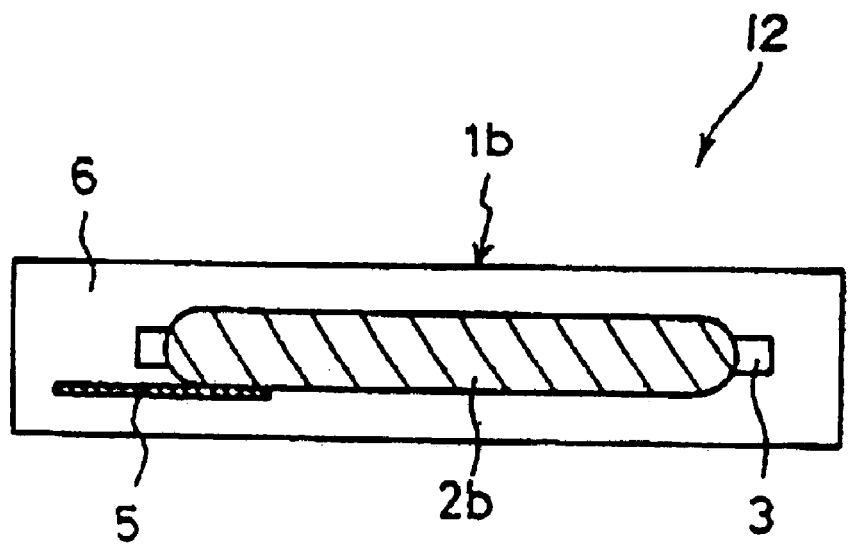
FIG. 10 is a cross-sectional view showing an example of a communication device regarding this invention where a sheet-like magnetic material is arranged to an RFID tag having a cylindrical antenna coil.
Figure 11:
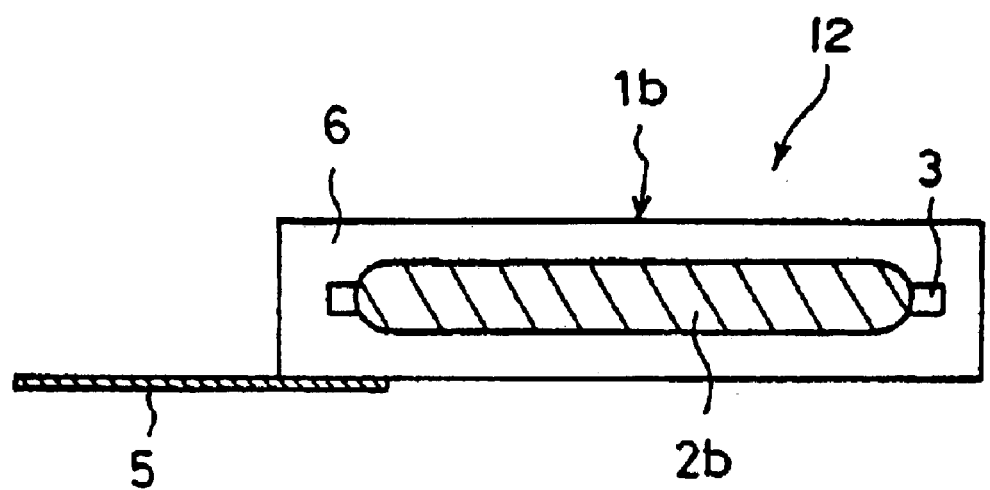
FIG. 11 is a cross-sectional view showing an example of a communication device regarding this invention where a sheet-like magnetic material is arranged to an RFID tag having a cylindrical antenna coil.

As shown in FIG. 10 and FIG. 11, the sheet-like amorphous magnetic material 5 serving as a sheet-like magnetic material with a high specific magnetic permeability is arranged on one side of a core member 3 of the RFID tag 1b having a cylindrical antenna coil 2a, in which the sheet-like amorphous magnetic material 5 is arranged in a manner extending from one of the tip end portions of the core member 3 to an outward direction of the core member 3.

The antenna coil 2b has the magnetic flux generating portion A (see FIG. 13) formed on an end portion in an axial direction thereof, in which the end portion has an sheet-like amorphous magnetic material 5 arranged thereto in a manner extending to an outward direction of the antenna coil 2b.

Figure 12:
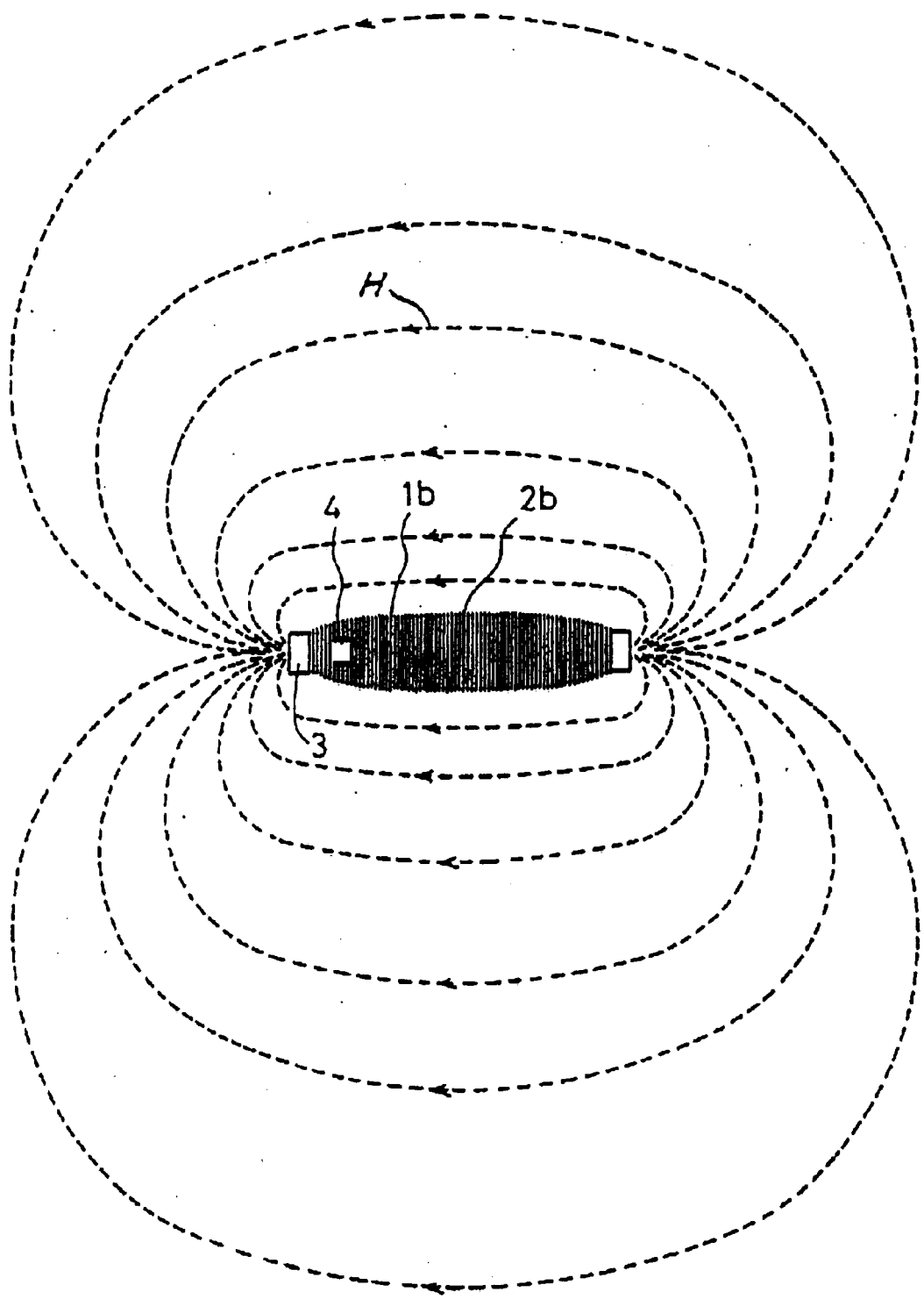
FIG. 12 shows a state of a structure of an RFID tag having a cylindrical antenna coil and a magnetic field created at the antenna coil.

As shown in FIG. 12, the core member 3 having a cylindrical shape and being made of iron, ferrite or the like is inserted into the single-wire-wound cylindrical antenna coil 2b along the axial direction of the antenna coil 2b (the lateral direction in FIG. 12).

As a typical example of the antenna coil 2b, a single copper wire having a diameter of approx. 30 μm is wound in a stacked form in the axial direction and in a cylindrical form; where an inductance of such antenna coil 2b was approx. 9.5 mH (at 125 kHz), and an electrostatic capacity of a capacitor connected for resonation to the antenna coil 2b was approx. 170 pF (at 125 kHz).

In FIG. 10, a square-like sheet-like amorphous magnetic material 5 is arranged and adhered to the bottom surface of the antenna coil 2b in a manner extending from an end portion in an axial direction and extending to an outward axial direction, wherein the antenna coil 2b, the core member 3, the semiconductor IC chip 4 (see FIG. 12) and the sheet-like amorphous magnetic material 5 are sealed and fixed by the resin 6 in an integrated manner.

In FIG. 11, after the antenna coil 2b, the core member 3, and the semiconductor IC chip 4 are sealed into a case by the resin 6, a square-shaped sheet-like amorphous magnetic material 5 is fixed and adhered to a bottom portion of the case in a manner extending from the end portion of the antenna coil 2b in an axial direction and extending to an outward axial direction.

It is now to be noted that the two sheets of the sheet-like amorphous magnetic material 5 can be respectively arranged upon the top and bottom side of the antenna coil 2b in a manner sandwiching the end portion of the antenna coil 2b in an axial direction; or one sheet of the sheet-like amorphous magnetic material 5 could be formed in a letter U shaped cross-section and arranged in a manner sandwiching the end portion of the antenna coil 2b in an axial direction. Further, a cap-shaped sheet-like amorphous magnetic material 5 could be arranged in a manner covering the end portion of the antenna coil 2b in an axial direction.

Figure 13:
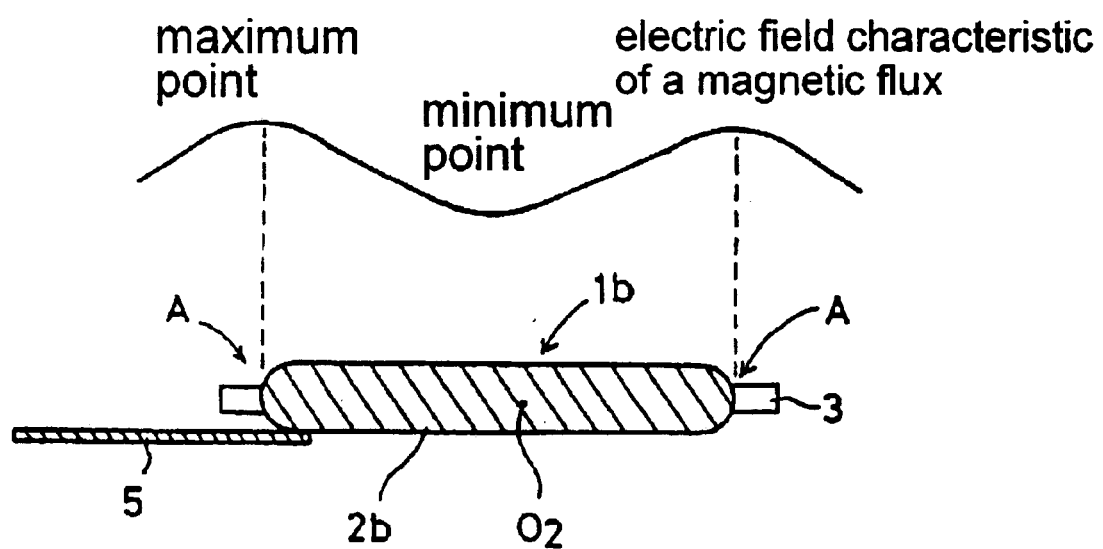
FIG. 13 is a diagram showing an electric field characteristic of a magnetic flux created from an antenna coil of a cylindrical RFID tag for a communication device regarding this invention.

FIG. 13 indicates the electric field characteristic at each position of the RFID tag 1b having a cylindrical antenna coil 2b, which has been measured in a same manner by the measurement device shown in FIG. 6. As shown in FIG. 13, a numeral $o_2$ being the center of antenna coil 2b becomes the minimum point regarding the electric-field characteristic of the magnetic flux, and both end portions of the antenna coil 2b become the maximum point regarding the electric-field characteristic.

Figure 14:
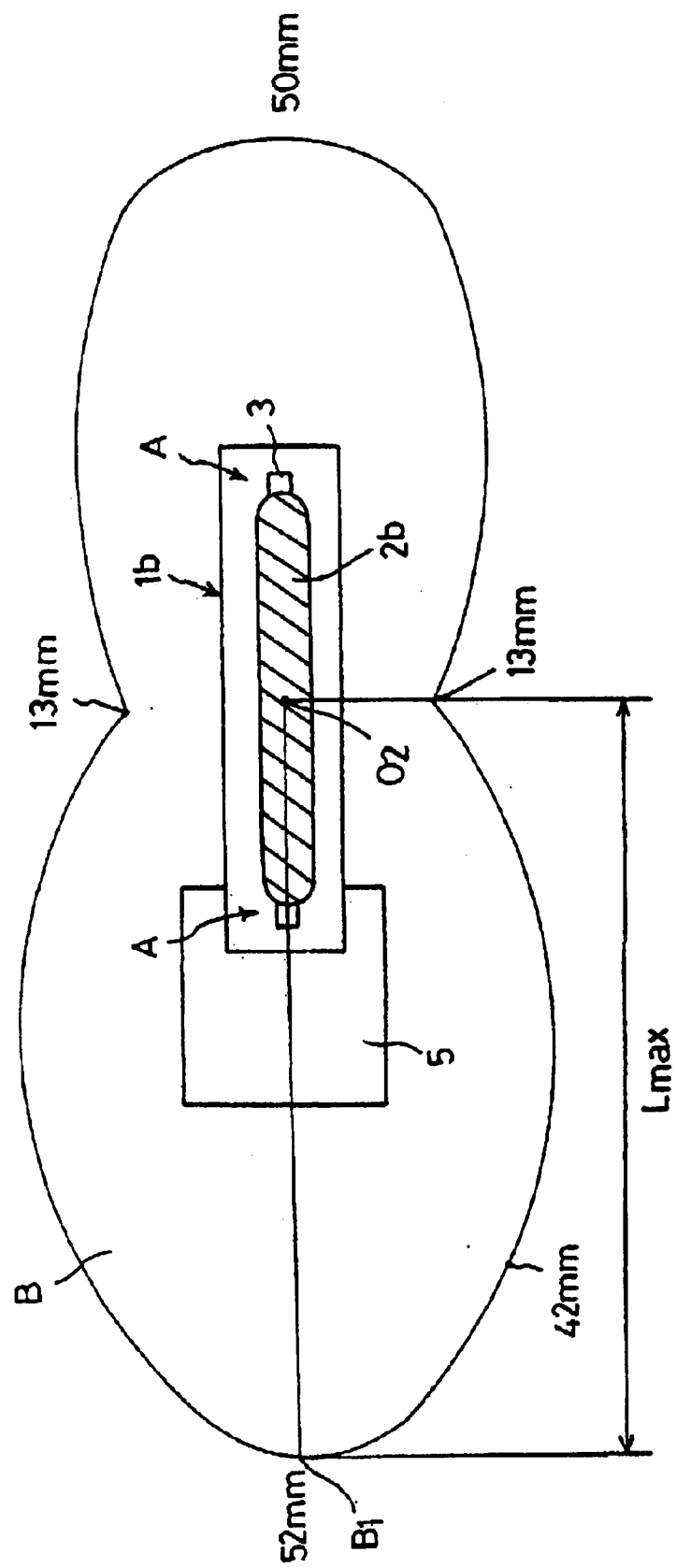
FIG. 14 shows an experiment result of a communicable magnetic flux area (communicable maximum distance) in an axial direction of an antenna coil regarding the RFID tag shown in FIG. 1.

FIG. 14 shows an experiment result of a communicable magnetic flux area B (communicable maximum distance $L_{max}$) of the antenna coil 2b of the RFID tag 1b shown in FIG. 11. Employed for the sheet-like amorphous magnetic material 5 is a Fe—Ni—Mo—B—S system manufactured by Allied Signal Inc. U.S.A. having a maximum magnetic permeability μ of 800000, having a thickness of 30 μm, and having each side of the four sided square shape of a 10 mm length, wherein the sheet-like amorphous magnetic material 5 is arranged in a manner extending from the magnetic flux generating portion A formed at both end portions of the antenna coil 2b to an outward direction of the antenna coil 2b.

The maximum communicable distance $L_{max}$ is measured by the measuring device shown in FIG. 6 in a state where the RFID tag 1b is arranged upon a stainless steel sheet. As shown in FIG. 14, the communicable magnetic flux area B is formed in a gourd-shape along an axial direction of the antenna coil 2b; extending in an axial direction of antenna coil 2b, the maximum point $B_1$ of the maximum communicable distance $L_{max}$ appears on the side where the sheet-like amorphous magnetic material 5 is arranged.

In FIG. 14, on the side where the sheet-like amorphous magnetic material 5 is arranged in a manner extending in an axial direction of antenna coil 2b, the maximum communicable distance $L_{max}$ from the center $o_2$ of the antenna coil 2b to the maximum point $B_1$ was 52 mm; on the opposite side of the sheet-like amorphous magnetic material 5 extending in an axial direction of antenna coil 2b, the maximum communicable distance $L_{max}$ was 50 mm; and the maximum communicable distance $L_{max}$ starting from the center $o_2$ in a direction perpendicularly intersecting to the axial direction of the antenna coil 2b is 13 mm.

Figure 15:
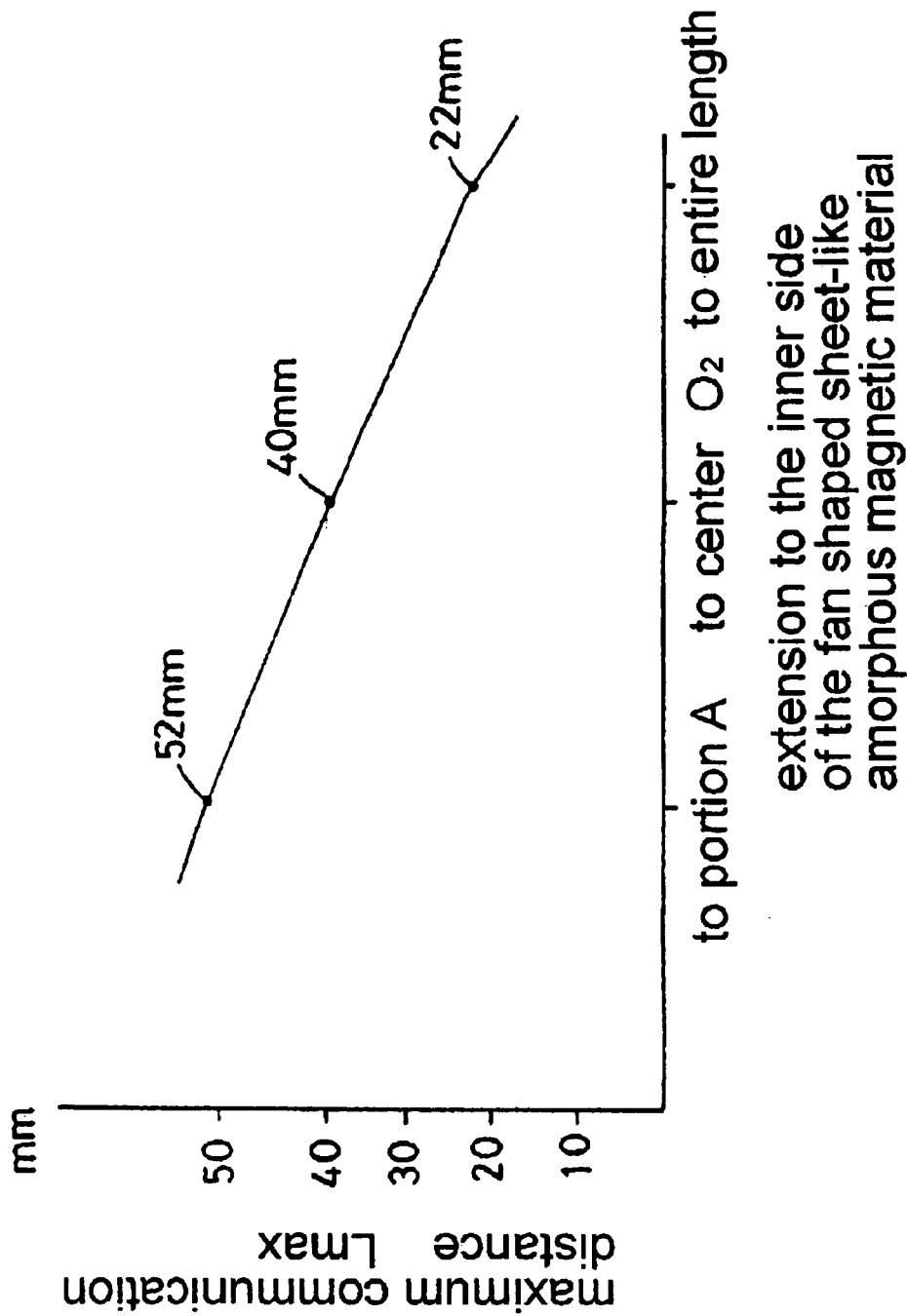
FIG. 15 is a diagram showing an experiment result regarding a relationship between a communicable magnetic flux area (communicable maximum distance) of an antenna coil in an axial direction and an extension length when the sheet-like magnetic material shown in FIG. 14 is simultaneously extended from a magnetic flux generating portion to a center bound axial direction of the cylindrical antenna coil.

FIG. 15 is one example showing a maximum communicable distance $L_{max}$ when the sheet-like amorphous magnetic material 5 shown in FIG. 14 is also extended from the magnetic flux generating portion A to a central side (right side of FIG. 14) in an axial direction of the antenna coil 2b.

In FIG. 14, when the right end portion of the sheet-like amorphous magnetic material 5 was positioned at the magnetic flux generating portion A, the maximum communicable distance $L_{max}$ was 52 mm as mentioned above; when the right end portion of the sheet-like amorphous magnetic material 5 was extended to the center $o_2$ of the antenna coil 2b, the maximum communicable distance $L_{max}$ was 40 mm; and when the sheet-like amorphous magnetic material 5 was extended across the entire length of the antenna coil 2b, the maximum communicable distance $L_{max}$ was 22 mm.

As for conductive materials which generate an eddy current from the magnetic field H generated during communication or electric power transmittal with the RFID tag 1a, 1b and generate a counter magnetic flux to attenuate the initial magnetic flux and to cause an adverse effect in communication, there are for example the aforementioned stainless steel sheet, copper sheet and aluminum sheet, and also ferromagnetic metals such as iron, cobalt, nickel, alloys thereof and ferrite, paramagnetic metals such as aluminum, copper and chrome, and conductive plastics.

Figure 16:
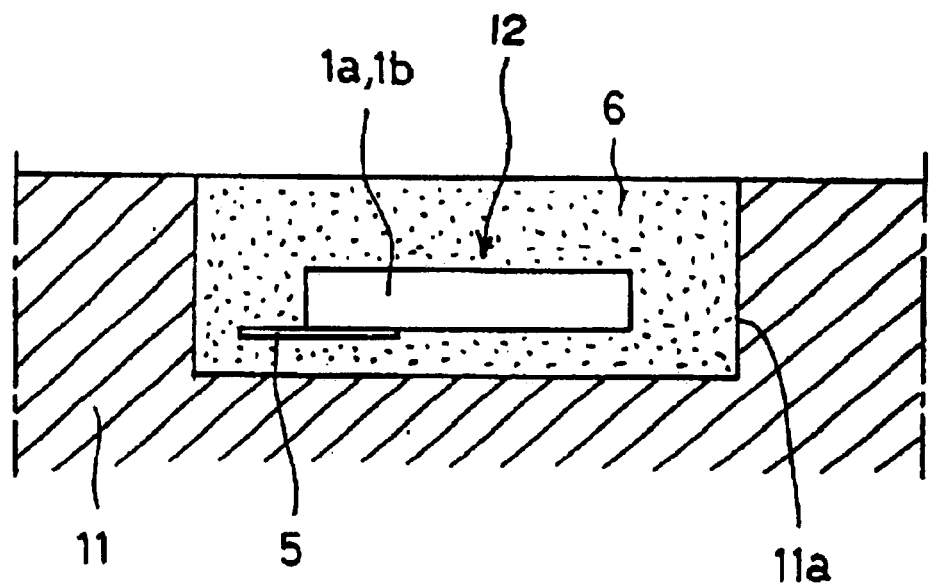
FIG. 16 is a cross-sectional view for showing various installment structures where a communication device regarding this invention is attached to an installment member made from a conductive material.

In FIG. 16, the RFID tag 1a, 1b, which includes the concentric disk-shape antenna coil 2a or the cylindrical antenna coil 2b having the sheet-like amorphous magnetic material arranged thereto in the aforementioned manner, is housed within an installment groove portion 11a of an installment member 11 serving as an installing object made from a conductive material having a circular grooved cross-section or the like, and the resin 6 serving as a protective member covers and seals at least the surface of the RFID tag 1a, 1b.

In FIG. 16, an external read/write device (not shown) could perform non-contact communication using electromagnetic wave and extract information memorized into the RFID tag 1a, 1b by using a magnetic field formed from a leaking magnetic flux which leaks upward of the resin 6. Other than a circular shape, the shape of the cross-section of the installment groove portion 11a could be a square shape, an elliptic shape, circular arc groove shape and other various shapes.

Although not shown in the drawings, the RFID tag 1a, 1b having the antenna coil 2a, 2b with the sheet-like amorphous magnetic material 5 arranged thereto is housed within the installment groove portion 11a, wherein at least the surface of the RFID tag 1a, 1b can be covered and protected by a substantially flat lid member serving as a protective member made from a conductive material or a non-magnetic member (such as resin or ceramic).

The lid member could be fixed to the installment member 11 by screwing, bolting, or adhering, according to circumstance. When the lid member is of a conductive material, a magnetic flux leakage path is formed at the bonding portion between the installment member 11 and the lid member so that a sufficient amount of magnetic flux could leak for enabling sending/receiving at a practical level; for example, a flat smooth contacting surface for providing a prescribed gap is to be formed when fixing by means of adhering or bolting, and a contacting surface of a screw portion for providing a prescribed gap is to be formed at a screw engagement portion when fixing by means of screwing.

It is realistic to form the contacting surface by means of processing the surface roughness of the contacting surface and not by means of designing a particular gap; in such case, the opposing contacting surfaces should contact in a dispersed manner so that the magnetic flux leakage path could be formed at the dispersed non-contacting portions.

For example, it has been proved that a gap of at least approx. 0.08 $\mu$m could be formed to obtain a prescribed practical amount of leaked magnetic wave by means of processing the surface roughness of one of the opposing sides into approx. 0.04 $\mu$m.

It should now be noted that a notch, a hole, or a slit or the like could be formed at the lid member for serving as the magnetic flux leakage path for leaking magnetic flux. Subsequently, an external read/write device (not shown) could extract information memorized into the RFID tag 1a, 1b by using a magnetic field formed from a leaking magnetic flux, which leaks from the magnetic flux leakage path formed between the installment member 11 and the lid member.

It should now be noted that when the lid member is of a non-magnetic material, an external read/write device (not shown) could extract information memorized into the RFID tag 1a, 1b by using a magnetic field formed from a leaking magnetic flux, which leaks upward of the resin 6 and the lid member.

It should now be noted that a notch, a hole, or a slit or the like could be formed at the lid member for serving as the magnetic flux leakage path for leaking magnetic flux. The slit is formed in a shape of a straight line, a shape of a cross, or a radiating shape, at the ceiling center portion of the cap-like lid member.

Figure 17:
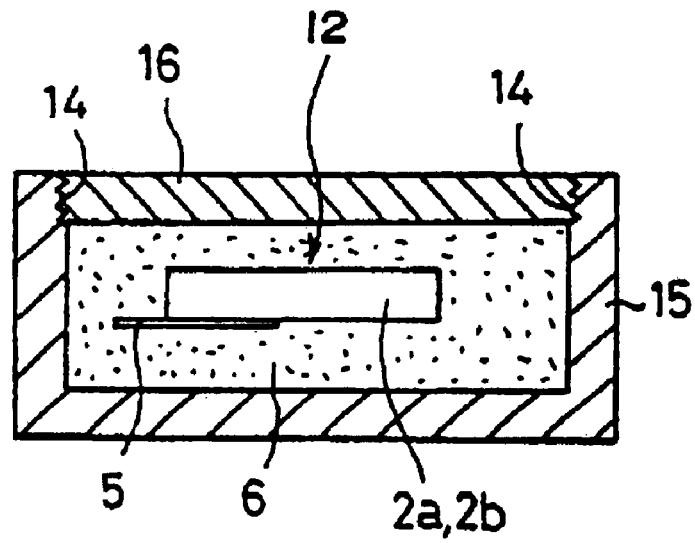
FIG. 17 is a cross-sectional view for showing various installment structures where a communication device regarding this invention is attached to an installment member made from a conductive material.

In FIG. 17, the RFID tag 1a, 1b having the concentric disk-shaped antenna coil 2a or the cylindrical antenna coil 2b with the sheet-like amorphous magnetic material 5 arranged thereto is housed inside a container comprised of a lid member 16 and a housing container 15 made from a conductive material being separable into at least two portions, wherein the magnetic flux leakage path 14 is formed at the bordering portions of the lid member 16 and the housing container 15 being the separable portions of the container, or formed upon at least either the housing container 15 or the lid member 16.

The lid member 16 could also be fixed to the housing container 15 by screwing or adhering or the like, according to circumstance. When the lid member 16 is of a conductive material, a magnetic flux leakage path 14 is formed at the bonding portion between the housing container 15 and the lid member 16 so that a sufficient amount of magnetic flux could leak for enabling sending/receiving at a practical level; for example, a flat smooth contacting surface for providing a prescribed gap is to be formed when fixing by means of adhering, and a contacting surface of a screw portion for providing a prescribed gap is to be formed at a screw engagement portion when fixing by means of screwing.

It should now be noted that a notch, a hole, or a slit or the like could be formed at the lid member 16 or the housing container 15 for serving as the magnetic flux leakage path 14 for leaking magnetic flux. Subsequently, an external read/write device (not shown) could extract information memorized into the RFID tag 1a, 1b by using a magnetic field formed from a leaking magnetic flux, which leaks from the magnetic flux leakage path 14 formed between the housing container 15 and the lid member 16.

Figure 18:
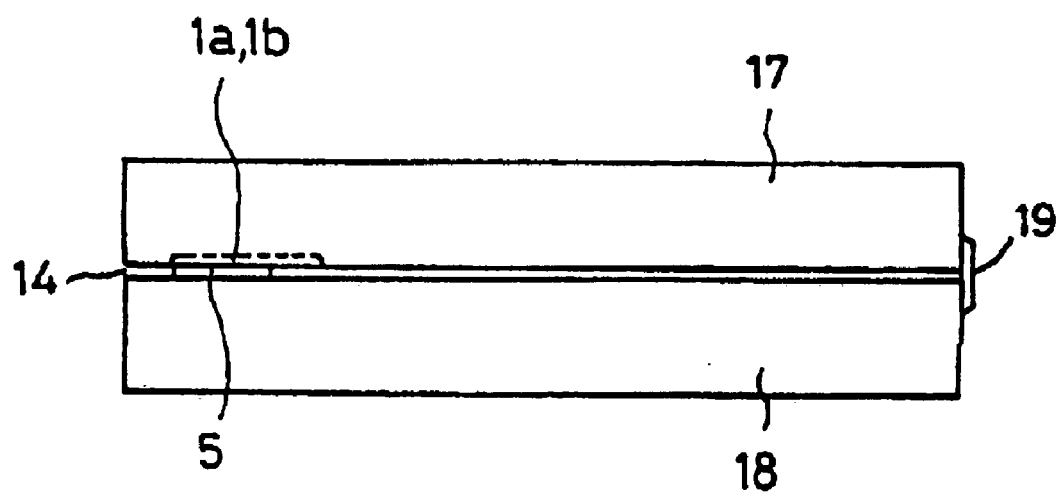
FIG. 18 is a side view showing a state where a communication device regarding this invention is arranged to a freely openable installment member made from a conductive material.

In FIG. 18, the RFID tag 1a, 1b having the concentric disk-shaped antenna coil 2a or the cylindrical antenna coil 2b with the sheet-like amorphous magnetic material 5 arranged thereto is attached to an upper lid 17 or a main body 18 of a laptop personal computer or the like being the installment member made from a conductive material, wherein one end portion of the upper lid 17 and the main body 18 are attached by an opening-closing mechanism 19 (e.g. a hinge mechanism) for forming an openable structure relative to each other.

The magnetic flux leakage path 14 is formed at an opening-closing surface being a bonding portion between the upper lid 17 and the main body 18 so that a sufficient amount of magnetic flux could leak for enabling sending/receiving at a practical level, and a substantially flat smooth contacting surface for providing a prescribed gap is formed.

Subsequently, an external read/write device (not shown) could extract information memorized into the RFID tag 1a, 1b by using a magnetic field formed from a leaking magnetic flux, which leaks from the magnetic flux leakage path 14 formed between the upper lid 17 and the main body 18. It is preferable for the sheet-like amorphous magnetic material 5 to be extended from the antenna coil 2a or 2b to the magnetic flux leakage path portion.

Although not shown in the drawings, the RFID tag 1a, 1b having the concentric disk-shaped antenna coil 2a or the cylindrical antenna coil 2b with the sheet-like amorphous magnetic material 5 arranged thereto is fixed by means of adhering or the like upon a printed circuit board being the installment member made from a conductive material, in which the printed circuit board can be formed from stacked metal sheets or electric circuits.

The magnetic flux leakage path is formed at a space created by a spacer or the like between the stacked printed circuit boards so that a sufficient amount of magnetic flux could leak for enabling sending/receiving at a practical level.

Subsequently, an external read/write device (not shown) could extract information memorized into the RFID tag 1a, 1b by using a magnetic field formed from a leaking magnetic flux, which leaks from the magnetic flux leakage path formed between the respective stacked printed circuit boards.

The container can for example be formed into a card type by overlapping and joining two sheet-like members. The communication device 12 can be a metal nameplate allowing non-contact communication.

It is now to be noted that the RFID tag 1b having the cylindrical antenna coil 2b with the sheet-like amorphous magnetic material 5 arranged thereto, can be placed in a slanting manner inside the installment groove portion 11a of the installment member 11 made from a conductive material, and can be sealed and fixed therein by the resin 6.

A flat sheet-like amorphous magnetic material 5 can be arranged in a manner extending in a direction toward an opening portion of the installment groove portion 11a from the magnetic flux generating portion A formed in an axial direction at the end portion of the cylindrical antenna coil 2b to a portion close to an opening surface.

The sheet-like amorphous magnetic material 5 can be arranged and fixed by means of adhering or the like upon a peripheral surface wall of the installment groove portion 11a in an encircling manner, and the RFID tag 1b having the cylindrical antenna coil 2b can be slantingly arranged with the tip portion of the antenna coil 2b being close to or contacting to the sheet-like amorphous magnetic material 5.

Although the foregoing embodiment describes one example of the communication device 12 being installed inside the installment groove 11a formed on the surface of the conductive installing object, the communication device 12 can also be arranged on the surface of the conductive installing object.

It should now be noted that each of the foregoing embodiments are examples having the RFID tag 1a, 1b serve as the communication device 12. Other possible examples of the communication device 12 are: a read/write device for communicating with RFID tag 1a, 1b; and a sheet-like amorphous magnetic material 5 having a high specific magnetic permeability arranged in a manner extending from a magnetic flux generating portion formed at the antenna coil of an IC card or the like having the antenna coil and the control section, and thus extending in an outward direction of the antenna coil.

This communication device 12 enables non-contact communication with the external by using electro-magnetic wave in a state where the directivity of the antenna coils 2a or 2b is enhanced by the sheet-like amorphous magnetic material 5.

With the communication device 12 shown in FIG. 19 to FIG. 24, an antenna coil 2a of an RFID tag 1a, a sender/receiver 4c comprised of a sender/receiver circuit, a memory 4b comprised of a memory circuit, and a CPU (central processing unit) 4a comprised of a control circuit are contained inside a sealed container serving as a container made from a non-conductive resin or the like, and a sheet-like amorphous magnetic material 5 being a sheet-like magnetic material with a high specific magnetic permeability is arranged parallel to one side of the antenna coil 2a of the RFID tag 1a.

In a case where an antenna coil of a communication device is installed inside an object made from a conductive material, the sheet-like amorphous magnetic material 5 serving as a sheet-like magnetic material with a high specific magnetic permeability is extended in a prescribed length from the object to the external, so that a read/write device or the like arranged proximal to a tip end of the extended portion distanced from the object will enable communication with high sensitivity at the extended portion. In such case, the sheet-like amorphous magnetic material 5 can be extended in plural directions and is not restricted to being extended in a single direction of an antenna coil.

In such case, the sheet-like amorphous magnetic material 5 is arranged in a manner extending from a magnetic flux generating portion A of the antenna coil 2a to an outward direction of the antenna coil 2a, in which a primary sheet material 21 being placed upon the surface side of the RFID tag 1a and a secondary sheet material 22 being placed upon the surface side of the sheet-like amorphous magnetic material 5 are bonded to each other.

Figure 19:
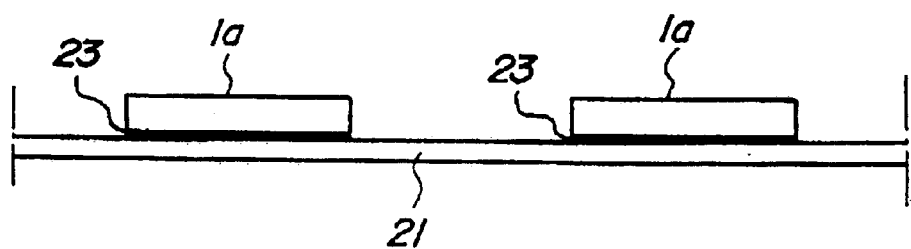
FIGS. 19(a) and (b) respectively show a side view and a plane view of a state where an RFID tag having a concentric disk-shaped antenna coil is arranged at a prescribed interval in a fixedly adherent manner to a primary sheet material.
Figure 19:
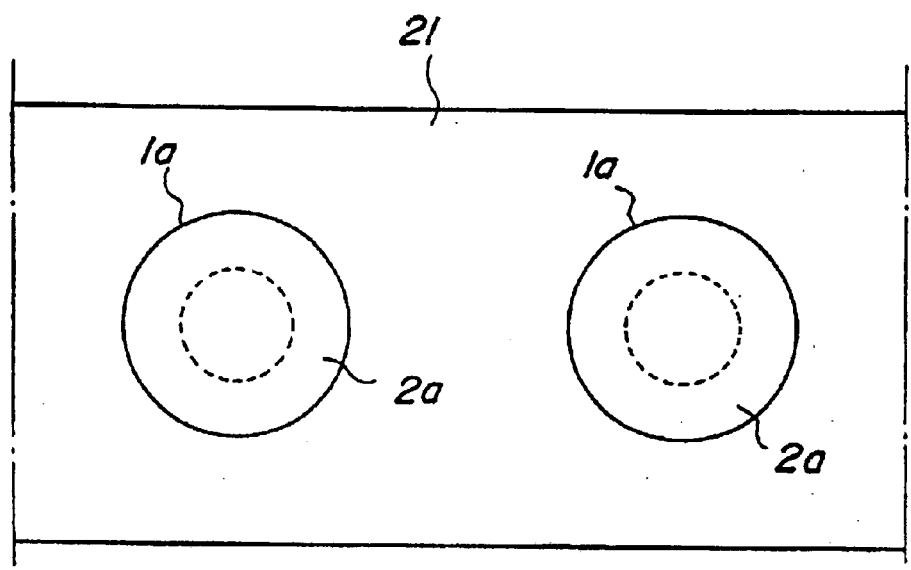
Figure 20A:
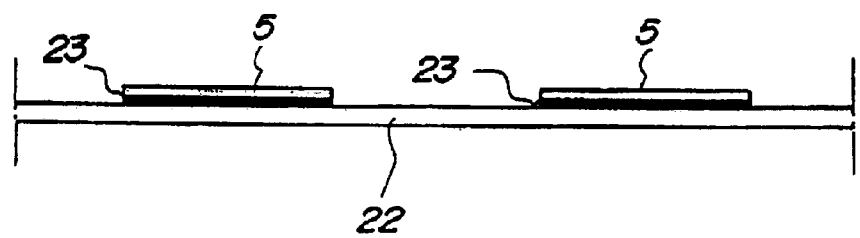
FIGS. 20(a) and (b) respectively show a side view and a plane view of a state where a fan shaped sheet-like magnetic material is arranged at a prescribed interval in a fixedly adherent manner to a secondary sheet material.
Figure 20B:
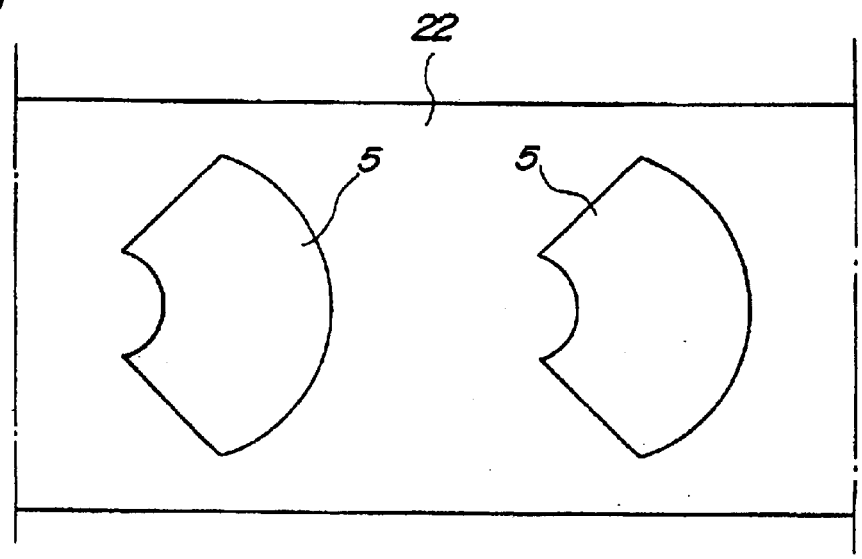

The method of manufacturing a communication device 12 of this embodiment has plural RFID tags 1a fixedly arranged at a prescribed interval along a longitudinal direction of the thin long primary sheet material 21 as shown in FIG. 19, and has plural sheet-like amorphous magnetic materials 5 serving as sheet-like materials fixedly arranged at a prescribed interval along a longitudinal direction of the thin long secondary sheet material 22 as shown in FIG. 20.

Figure 21:
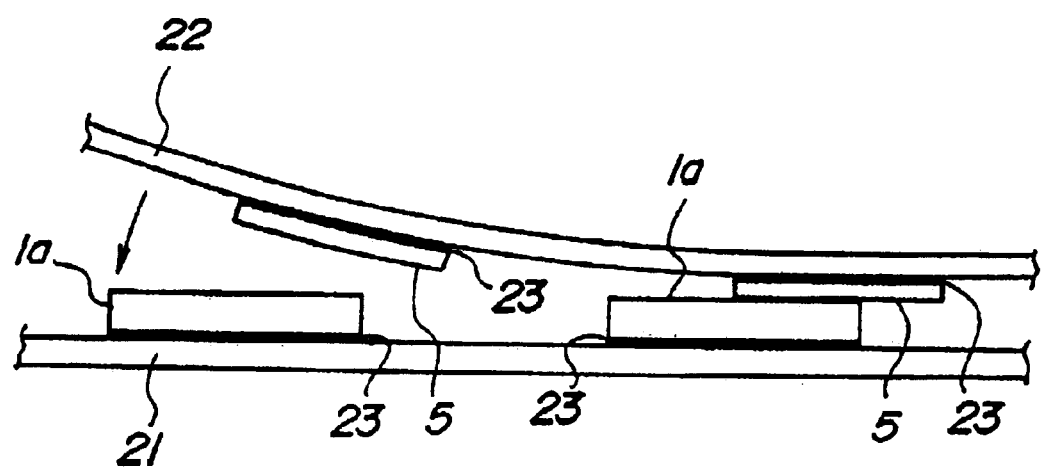
FIG. 21 is a side view showing a state of overlapping a primary sheet material with a secondary sheet material while adjusting a position for each pair comprising an RFID tag and a sheet material.

As shown in FIG. 21, the position of the respective RFID tags 1a and the respective sheet-like amorphous magnetic material 5 is adjusted so as to be matched into pairs, in which the primary and secondary sheet material 6, 7 are bonded to each other by means of thermal pressure or the like.

FIG. 19 shows a state where a plurality of RFID tag 1a having a concentric disk-shaped antenna coil 2a are arranged at a prescribed interval and fixed upon the thin long primary sheet material 21 by an adhesive agent 23 or the like; meanwhile, FIG. 20 shows a state where the sheet-like amorphous magnetic material 5 serving as a sheet-like magnetic material with a high specific magnetic permeability is formed in a shape of a fan, wherein a plurality of the sheet-like amorphous magnetic materials 5 are arranged at a prescribed interval and fixed upon the thin long secondary sheet material 22 by an adhesive agent 23 or the like.

The sheet-like amorphous magnetic material 5 can be directly formed upon the secondary sheet upon 22 by mixing a powder of an amorphous alloy into a resin binder with a high density, and printing with a method such as screen-printing. In such case, manufacture would become easier since the adhesive agent 23 or the like would be unnecessary.

A flexible sheet of polyethylene, polypropylene, polyamide vinyl chloride resin or a copolymer of the foregoing can be used as the primary and secondary sheet 21, 22; the primary sheet 21 and secondary sheet 22 can be welded and bonded to each other by means of applying heat and pressure, and can be of a transparent, semi-transparent or non-transparent sheet.

More particularly, direction of directivity or the like can be easily determined by having the secondary sheet material 22 in a transparent or semi-transparent manner since the sheet-like amorphous magnetic material 5 can be seen from outside, and further, installation and application can also be performed with ease.

The thin long primary sheet material 21 having fixedly arranged plural RFID tags 1a, and the thin long secondary sheet material 22 having fixedly arranged plural sheet-like amorphous magnetic materials 5 are respectively curled into a roll, and then, the rolls of the respective sheet materials are curled out facing each other while adjusting position, and then, the sheet materials are bonded in order by thermal welding.

FIG. 21 shows a state of overlapping a primary sheet material 21 with a secondary sheet material 22 when positionally adjusting the respective pairs comprising the RFID tag 1a being fixed to the primary sheet material 21 and the sheet-like amorphous magnetic material 5 being fixed to the secondary sheet material 22.

The RFID tag 1a and the sheet-like amorphous magnetic material 5 are positionally adjusted arranged in a manner where the sheet-like amorphous magnetic material 5 extends from a magnetic flux generating portion A formed between a diametral center $o_1$ (as explained above and shown in FIG. 5) of the antenna coil 2a of the RFID tag 1a and the inner peripheral portion 2a1 of the antenna coil 2a to an outward direction of the antenna coil 2a.

As shown in FIG. 20, the sheet-like amorphous magnetic material 5 is formed in a shape of a fan and is arranged in a manner extending from the magnetic flux generating portion A to an outward direction of the antenna coil 2a. The angle of the fan θ is desirable to be approximately 90 degrees, and from a practical aspect, the degree is desirable to be ranged between 60 degrees through 180 degrees.

Figure 22:
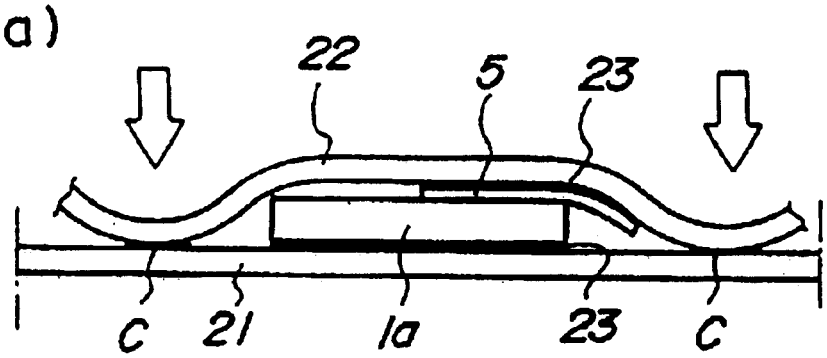
FIGS. 22(a) and (b) respectively show a side view and a plane view of a state where a primary sheet material and a secondary sheet material are bonded by heating and pressurizing at the periphery of an RFID tag and a sheet-like magnetic material.
Figure 22:
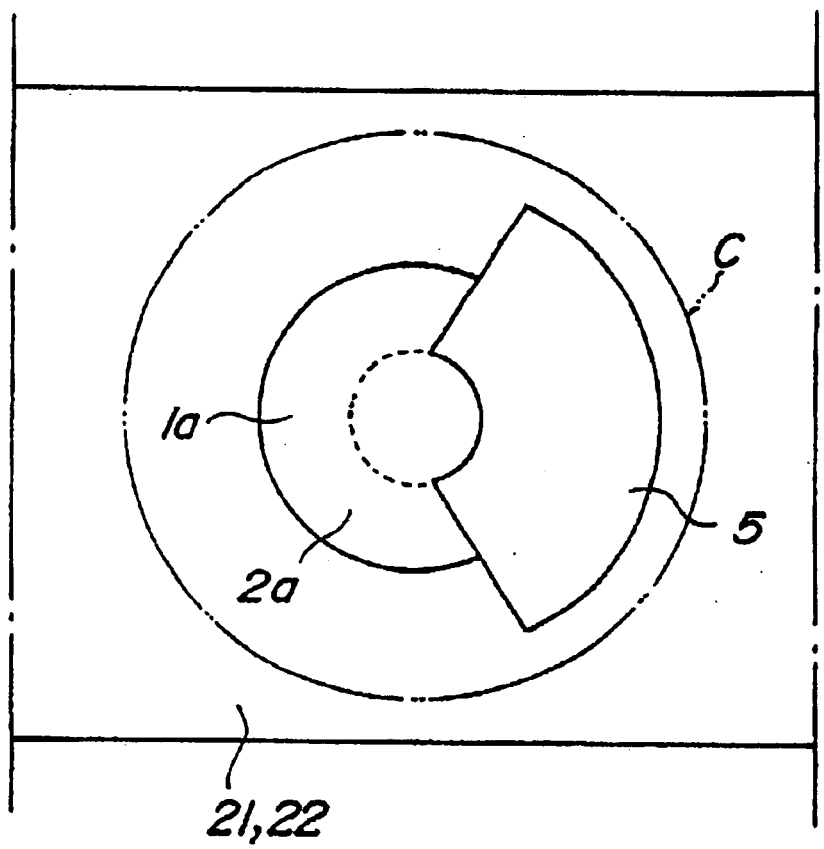

Subsequently, as shown in FIG. 22, at the periphery of the RFID tag 1a and the sheet-like amorphous magnetic material 5, the primary sheet material 21 and a secondary sheet material 22 are bonded (laminated) by means of heating and pressurizing.

In FIG. 22, the letter C indicates a bonding portion; and as shown in FIG. 22(b), the periphery of the RFID tag 1a and the sheet-like amorphous magnetic material 5 has a laminated bonding part at the external side of the bonding portion C (indicated with a long dash dot dot line in FIG. 22). Accordingly, damage from heat can be prevented for the RFID tag 1a by bonding in a manner slightly parted from the periphery of the RFID tag 1a.

Figure 23:
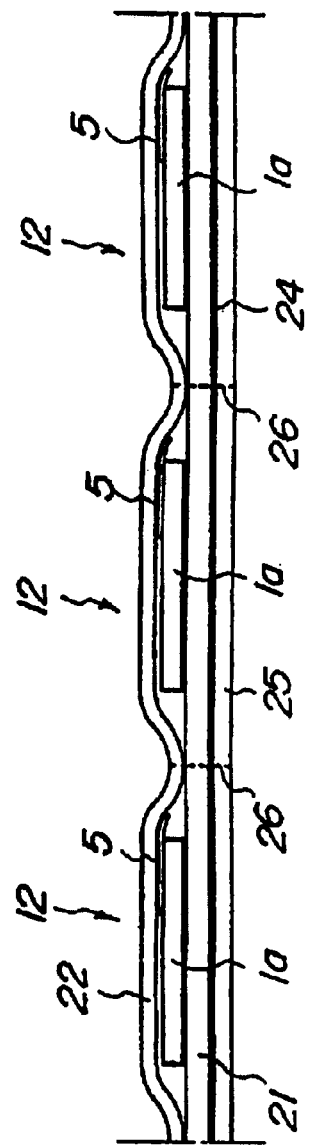
FIGS. 23(a) and (b) respectively show a side view and a plane view of a state where an adhesive agent layer at the backside of a bonded primary sheet material and a detachment layer are layered in order, and where a dividing portion such as a straight perforation is arranged at a bordering portion of each communication device.
Figure 23:
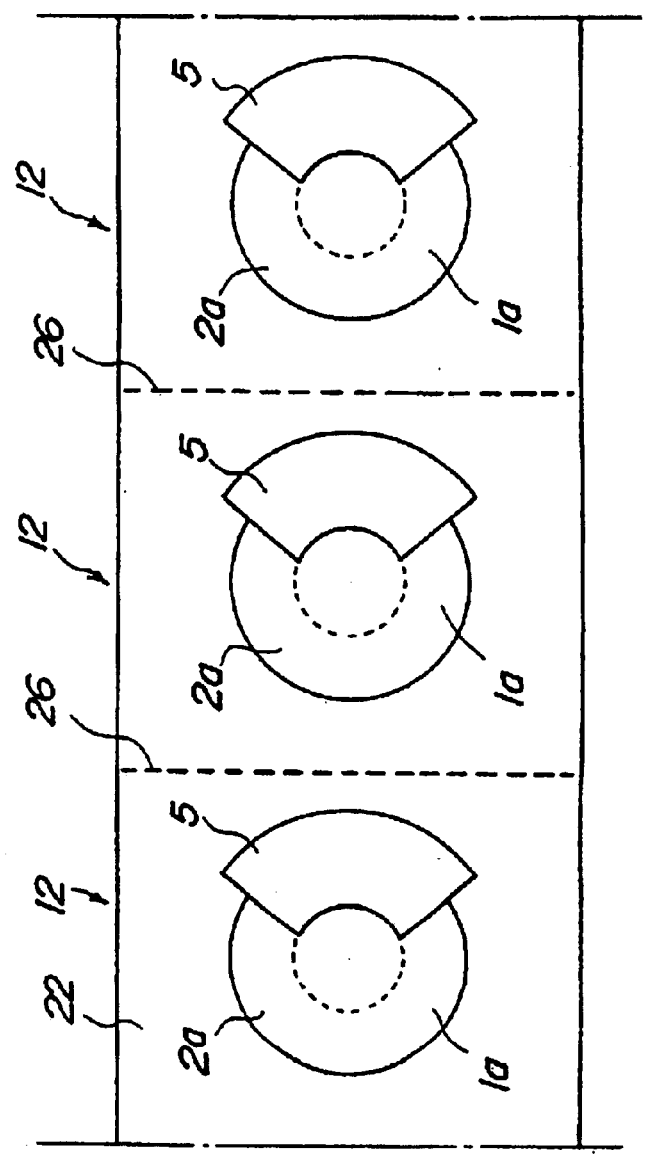
Figure 24:
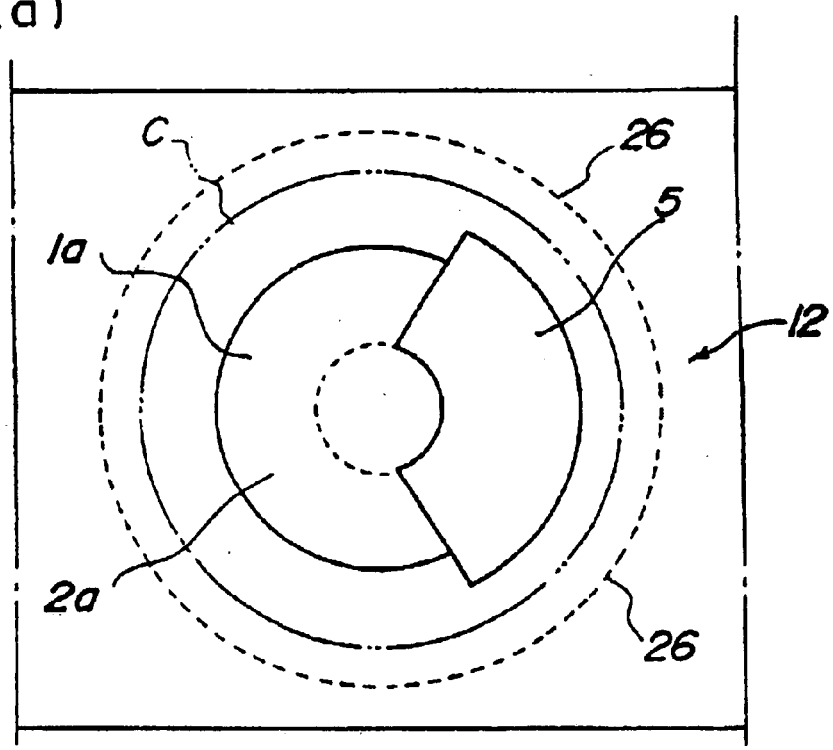
FIG. 24(a) is a plane view showing a state where a dividing portion such as a circular perforation is arranged at an outer side of a bonding border of each communication device.
FIG. 24(b) is a plane view of a communication device separated along a dividing portion such as a circular perforation.
Figure 24:
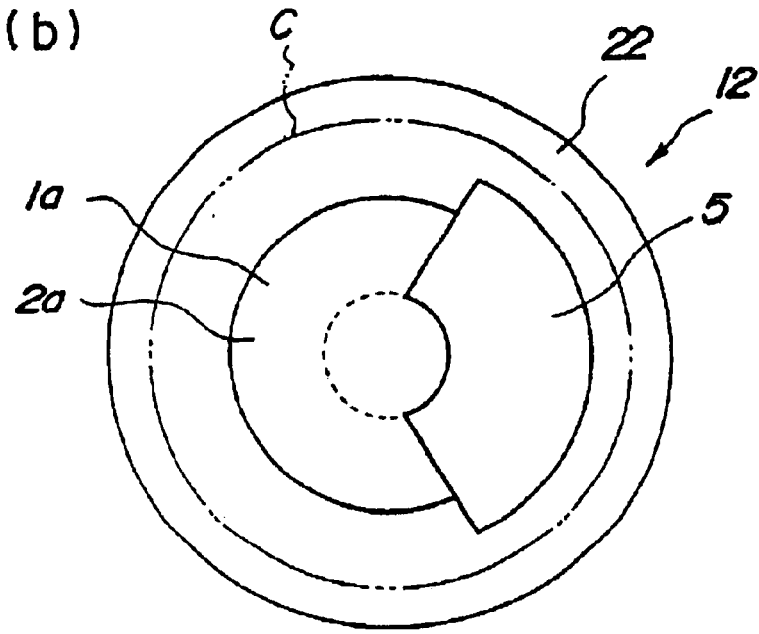

As shown in FIG. 23, following the bonding of primary sheet material 21 and the secondary sheet material 22, an adhesive agent layer 24 at the backside of the primary sheet material 21 and a detachment layer 25 are layered in order, and subsequently, a dividing portion 26 such as a perforation is arranged at a bordering portion of primary sheet material 21 and the secondary sheet material 22 for each communication device 12.

When separating the respective communication devices 12, the respective communication devices 12 can easily be separated by being torn apart from the dividing portion 26; when attaching the respective communication devices 12 to an object or the like, a detachment layer 24 (e.g. paper) is peeled to reveal the adhesive agent layer 24 and the adhesive agent layer 24 would stick upon an object so as to enable easy installment.

FIG. 24(a) shows a state where the circular dividing portion 26 (indicated with dotted line) is surrounding the outer side of the circular bonding portion C (indicated with a long dash dot dot line); FIG. 24(b) shows a state where the communication device is torn apart from the FIG. 24(a) along the dividing portion 26.

Other than a fan-shaped form, a square-like form or other various shapes could be employed as the shape of the sheet-like amorphous magnetic material with a high specific magnetic permeability.

Next, referring to FIG. 25 to FIG. 27, an exemplary structure of a communication device 12 having a cylindrical antenna coil 2b will hereinafter be explained. It should be noted that constitutions similar to those explained in the foregoing embodiment would be assigned with the same reference numerals, while omitting the explanations thereof.

The antenna coil 2b of an RFID tag 1b, a core member 3, a sender/receiver 4c comprised of a sender/receiver circuit, a memory 4b comprised of a memory circuit, and a CPU (central processing unit) 4a comprised of a control circuit as shown in FIG. 25 and FIG. 27 are contained inside a container body such as a non-conductive glass container or a sealed container made of resin or the like, in which plural RFID tags 1b having cylindrical antenna coils 2b are arranged at a prescribed interval and fixed to a primary sheet material 21 with an adhesive agent 23 or the like as shown in FIG. 25, and plural sheet-like amorphous magnetic materials 5 having a shape corresponding to the shape of the RFID tag 1b arranged at a prescribed interval and fixed to a secondary sheet material 22 with an adhesive agent 23 or the like as shown in FIG. 26.

FIG. 27 shows a bonding state where a primary sheet material 21 with fixedly arranged RFID tags 1b having plural cylindrical antenna coils 2b is bonded to a secondary sheet material 22 with fixedly arranged plural sheet-like amorphous magnetic materials 5.

As shown in FIG. 13, in terms of the RFID tag 1b having the cylindrical antenna coil 2b, the primary sheet material 21 and the secondary sheet material 22 are bonded so that the sheet-like amorphous magnetic material 5 serving as the sheet-like magnetic material having a high specific magnetic permeability would be arranged in a manner extending from the magnetic flux generating portion A formed at an end portion in a axial direction of antenna coil 2b (lateral direction of FIG. 13) to an outward direction of the antenna coil 2b.

Figure 27A:
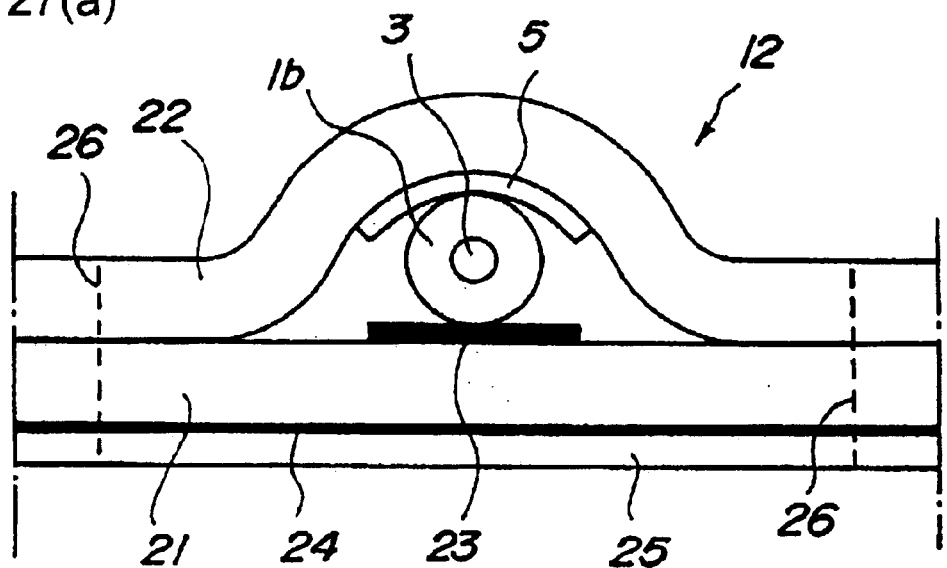
FIG. 27(a) is a side view showing an adhesive agent layer at the backside of a bonded primary sheet material and a detachment layer being layered in order in a state where the primary sheet material and a secondary sheet material are bonded by heating and pressurizing at the periphery of an RFID tag and a sheet-like magnetic material, in which a dividing portion such as a straight perforation is arranged at a bordering portion of each communication device.
Figure 27B:
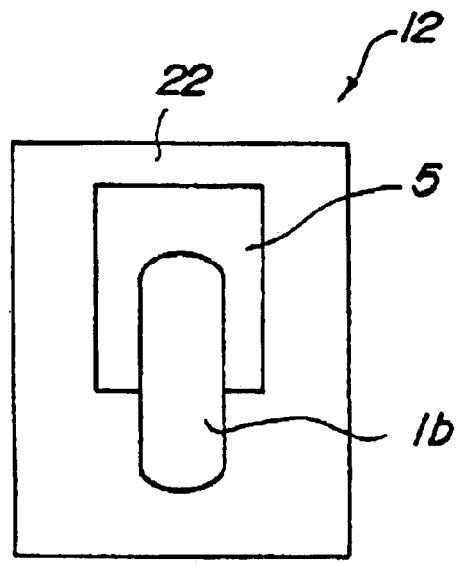
FIG. 27(b) is a plane view of a communication device separated along a dividing portion such as a perforation.

As shown in FIG. 27(a), following the bonding of primary sheet material 21 and the secondary sheet material 22, an adhesive agent layer 24 at the backside of the primary sheet material 21 and a detachment layer 25 are layered in order, and subsequently, a dividing portion 26 such as a perforation is arranged at a bordering portion of primary sheet material 21 and the secondary sheet material 22 for each communication device 12. FIG. 27(b) shows a communication device 12 being torn apart from the dividing portion 26.

Preferably, the primary sheet material 21 and the secondary sheet material 22 can be employed as a conductive material, a magnetic flux leakage path between the external and the internal can be formed at a bonding rim portion of the primary sheet material 21 and the secondary sheet material 22, and the sheet-like amorphous magnetic material 5 can be extended to the magnetic flux leakage path portion.

Figure 28:
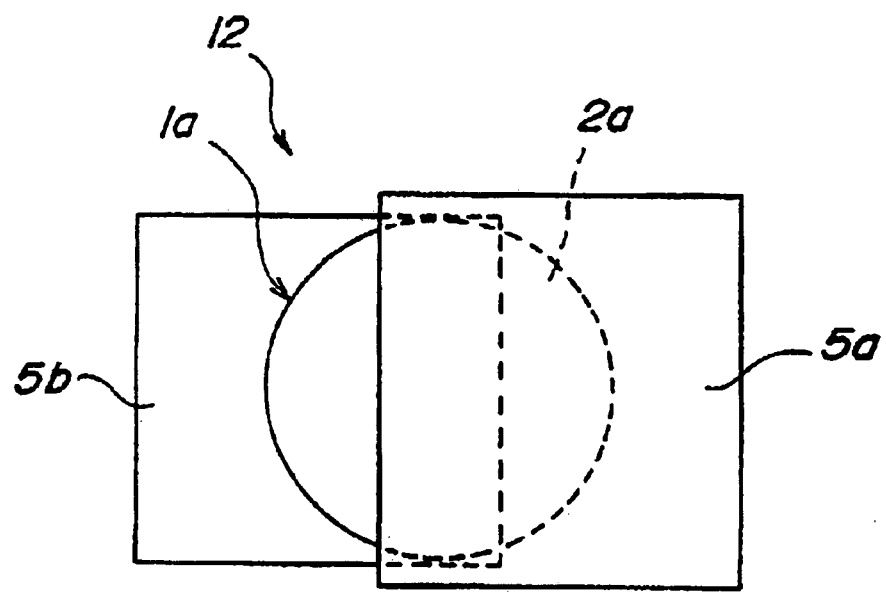
FIG. 28 is a plane view showing a composition of a communication device regarding this invention.
Figure 29:
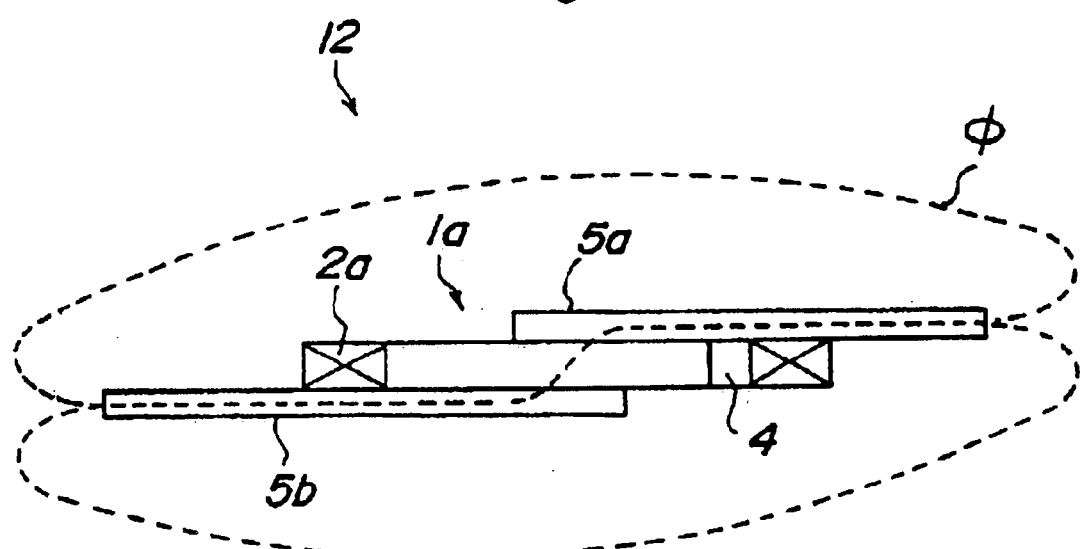
FIG. 29 is a side view of FIG. 28.

FIG. 28 is a plan view showing another structure of a communication device 12 regarding this invention, and FIG. 29 is an enlarged side view of FIG. 28. In these drawings, the communication device 12 has an RFID tag 1a for communicating by electromagnetic wave, a primary sheet-like magnetic material 5a and a secondary sheet-like magnetic material 5b, both of which are similar as those explained in the aforementioned sheet-like amorphous magnetic material 5.

Both the primary sheet-like magnetic material 5a and the secondary sheet-like magnetic material 5b are formed by cutting and processing a sheet-like magnetic material into a square-like shape having a thickness of approximately 10 $\mu$m through 50 $\mu$m. As shown in FIG. 28, the primary sheet-like magnetic material 5a is extended from a slightly left central portion to a right-outward direction along the top surface of the antenna coil 2a, wherein a portion of the primary sheet-like magnetic material 5a is fixed to the top surface side of the antenna coil 2a by means such as adhering.

Further, as shown in FIG. 28, the secondary sheet-like magnetic material 5b is extended from a slightly right central portion to a left-outward direction along the bottom surface of the antenna coil 2a, wherein a portion of the secondary sheet-like magnetic material 5b is fixed to the bottom surface side of the antenna coil 2a by means such as adhering.

Accordingly, each end portion for the primary sheet-like magnetic material 5a and the secondary sheet-like magnetic material 5b, both of which being positioned at a central portion of the antenna coil 2a, are partially overlapped to each other at a center portion of the antenna coil 2a.

Subsequently, as shown in FIG. 29, at least a portion of the magnetic flux passes through each the primary sheet-like magnetic material 5a and the secondary sheet-like magnetic material 5b having magnetic resistance exceedingly lower than that in the air, and then forms a magnetic flux path (magnetic flux loop) φ, which passes through the antenna coil 2a and flatly expands in a manner shown with a broken line in FIG. 29.

Although the secondary sheet-like magnetic material 5b in FIG. 28 is illustrated with a width slightly smaller than the primary sheet-like magnetic material 5a for making the drawing easier to understand, the actual width for both are the same.

As shown in FIG. 29, since the magnetic flux path φ expands in a direction parallel to the surface of the antenna coil 2a, the communication distance extends in thus direction and the communication directivity is heightened in thus direction. It should now be noted that the principle regarding thus expansion of communication distance could be comprehended in a similar manner as that explained above.

Although the aforementioned conventional example shown in Japanese Patent Publication No.2000-48152 has a sheet-like magnetic material inserted through antenna coil 2a, this embodiment does not employ such inserting-through method; instead, the primary sheet-like magnetic material 5a arranged on one side of the antenna coil 2a is extended in an outward direction, and the secondary sheet-like magnetic material 5b arranged on the other side of the antenna coil 2a is extended in an opposite outward direction, and subsequently, the primary sheet-like magnetic material 5a and the secondary sheet-like magnetic material 5b serve to form the continuous magnetic flux path φ passing through the antenna coil 2a.

The communication sensitivity of the communication device 12 is proportional to a magnetic flux density of the magnetic flux path φ, and the magnetic flux density is proportional to the specific magnetic permeability of the primary sheet-like magnetic material 5a and the secondary sheet-like magnetic material 5b. Accordingly, the primary sheet-like magnetic material 5a and the secondary sheet-like magnetic material 5b having high specific magnetic permeability should be selected, and it is desirable for a magnetic material to have a specific magnetic permeability of at least ten thousand or more. A sheet-like amorphous magnetic material could be given as an example of a magnetic material comprising a magnetic material with a high specific magnetic permeability.

Figure 30:
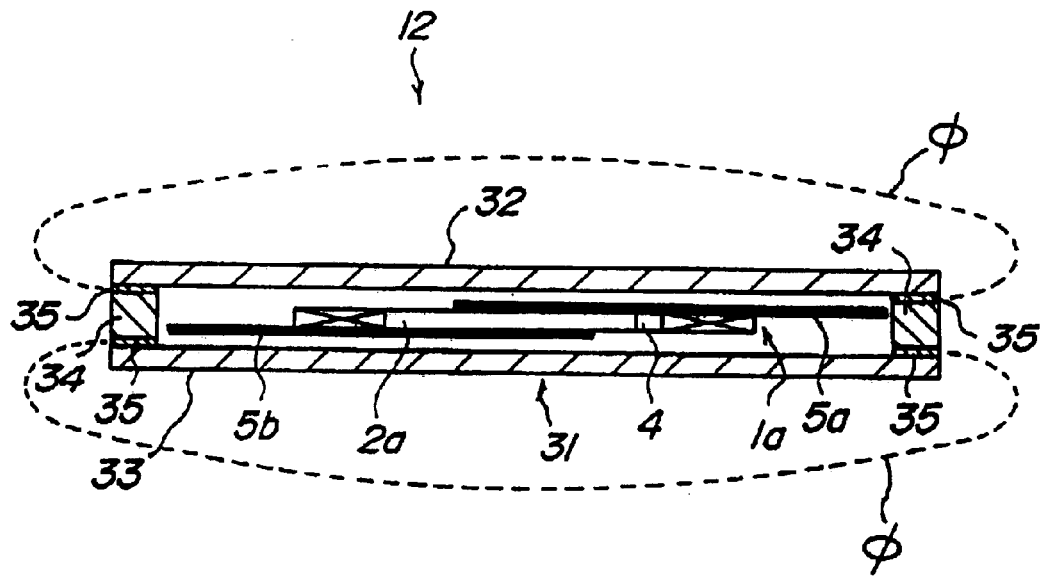
FIG. 30 is a cross-sectional view showing another embodiment of a communication device regarding this invention.

FIG. 30 shows another embodiment of the communication device 12. In this example, the RFID tag 1a, the primary sheet-like magnetic material 5a and the secondary sheet-like magnetic material 5b shown in FIG. 28 are all housed inside a thin type protective container 31 for allowing magnetic flux leakage.

The protective container 31 is comprised of a disk-shaped top lid 32, a disk-shaped bottom lid 33, and a ring-like intermediary frame member 34 serving to connected the lids. The protective container 31 can be made from a non-conductive material such as resin, aluminum, or an alloy thereof (e.g. duralumin).

In means to form the communication device 12 in FIG. 30, first, the primary sheet-like magnetic material 5a and the secondary sheet-like magnetic material 5b are extended by being respectively attached to a top side and a bottom side of the RFID tag 1a by means such as adhering. Then, the intermediary frame member 34 is arranged on top of the bottom lid 33 to house such as the RFID tag 1a therein. Then, an adhesive agent or a filling agent is filled into the container and is then solidified by being sealed with the top lid 32, and thereby the bottom lid 33, the intermediary frame member 34, and the top lid 32 can form a united body and can stably fix such as the RFID tag 1a therein.

Housing the main portion of the communication device 12 into the protective container 31 prevents physical or chemical influence from outside and influence from flooding caused during storage, transportation and use; further, the communication device 12 can be structured having an excellent appearance.

The communication device 12 regarding the present invention can serve as an information storage-type nameplate by attaching upon a surface for machines, devices, and components thereof and the like. In such case, the communication device 12 can be made into a long-lasting nameplate by forming the entire body of the protective container 31 or at least a surface portion thereof (e.g. top lid portion 32) with aluminum, an alloy thereof, or a magnetic metal, and inscribing letters, symbols or the like upon the surface portion.

The communication device 12 regarding the present invention can by formed into a card-like shape by reducing a thickness thereof. A metal sheet such as aluminum can be employed as the top lid 32 and the bottom lid 33 comprising the communication device 12 of a card type to provide durability for the communication device 12.

Generally, when the RFID tag 1a is covered by a protective container made from a conductive material, especially a metal material having low electric resistance, an overcurrent would be created at the conductive material from the magnetic flux (high frequency magnetic flux) during communication, and the overcurrent would create a negative magnetic flux from the opposing direction resulting to attenuation of magnetic flux necessary for communication, and further, communication would be impossible in most cases since magnetic flux could not pass in or out of the protective container.

However, experiments of the present invention revealed that communication is possible by making the protective container 31 with aluminum, or an alloy thereof being a conductive material, and structuring the protective container 31 into a magnetic flux leaking type. The protective container 31 could be structured into the magnetic flux leaking type by using any method for forming a gap to enable magnetic flux leakage.

Accordingly, when the protective container 31 is made from resin, there would be no problem since the resin itself is capable of magnetic flux leakage. In a case where aluminum or an alloy thereof is employed, the protective container 31 is separably formed into the top lid 32, the bottom lid 33, and the intermediary frame member 34 as shown in FIG. 30, wherein for example: a gap 35 for magnetic flux leakage could be arranged between the top lid 32 and the intermediary frame member 34 and also arranged between the bottom lid 33 and the intermediary frame member 34, and a non-conductive material such as rubber could intervene inside the gap 35 or a non-conductive material such as an adhesive agent could be filled and fixed inside the gap 35 in a manner serving to maintain the gap 35.

Although, the thickness of the gap 35, that is, the space between the top lid 32 and the intermediary frame member 34, and the space between the bottom lid 33 and the intermediary frame member 34 would depend on the desired amount of magnetic flux leakage, setting the thickness ranging approximately from several hundred μm to several mm would be sufficient for communicating regularly.

Thus structured, as shown in FIG. 30, the magnetic flux from the RFID tag 1a within the protective container 31 leaks from the secondary sheet-like magnetic material 5b to the external through the gap 35 illustrated at the left side of FIG. 30 and returns to the primary sheet-like magnetic material 5a from the gap 35 illustrated at the right side of FIG. 30 via the antenna coil 2a, so as to form the magnetic flux path φ in a manner illustrated with a broken line in FIG. 30. Accordingly, by using thus magnetic flux path φ, communication between the RFID tag 1a and an external read/write device can be achieved.

The closer each tip-end portion of the primary sheet-like magnetic material 5a and the secondary sheet-like magnetic material 5b is arranged to the gap 35, the more communication sensitivity would increase. For example, the communication sensitivity would become highest when each of the tip-end portions is inserted inside the gap 35 to a point reaching the outside of the protective container 31.

Figure 31:
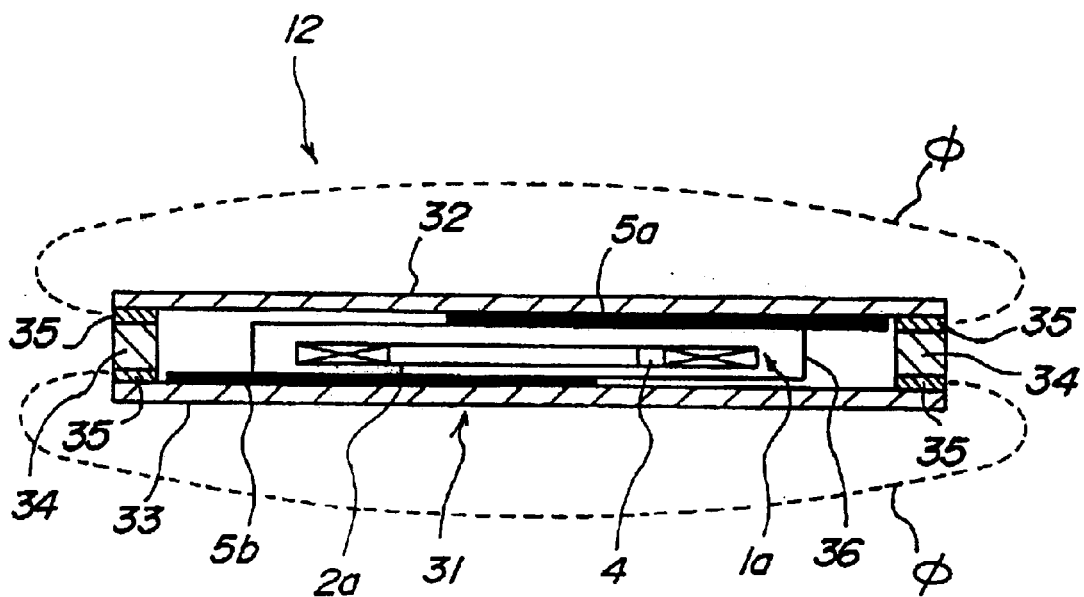
FIG. 31 is a cross-sectional view showing another embodiment of a communication device regarding this invention.

FIG. 31 is a cross-sectional view showing another embodiment of the communication device 12. In this embodiment a typical data carrier being massed produced and distributed in the market is employed, wherein the data carrier combining the primary sheet-like magnetic material 5a and the secondary sheet-like magnetic material 5b (both which being similar to those shown in FIG. 28) is contained inside the protective container 31. In these drawings, the RFID tag 1a being comprised of a disk-shaped antenna coil 2a and a semiconductor IC chip 3 is sealed inside a thin-type sealing container 36 made from a non-conductive material such as resin.

The primary sheet-like magnetic material 5a is arranged parallel along a top surface of the sealing container 36 and fixed thereto by means of adhering or the like; and the secondary sheet-like magnetic material 5b is arranged parallel along a bottom surface of the sealing container 36 and fixed thereto by means of adhering or the like.

A tip-end portion of the primary sheet-like magnetic material 5a is extended from a slightly left central portion of the antenna coil 2a arranged within the sealing container 36 shown in FIG. 31 and is extended to a right-outward direction; a tip-end portion of the secondary sheet-like magnetic material 5b is extended from a slightly right central portion of the antenna coil 2a arranged within the sealing container 36 shown in FIG. 31 and is extended to a left-outward direction.

Subsequently, the primary sheet-like magnetic material 5a, the secondary sheet-like magnetic material 5b, and the sealing container 36 are housed inside the protective container 31 and are molded by filling an adhesive agent or the like into the protective container 31, which would result to forming the communication device 12 of FIG. 31. The protective container 31 shown in FIG. 31 is structured in the similar manner as FIG. 30, in which, for example, the gap 35 is formed between the top lid 32 and the intermediary frame member 34, and also between the bottom lid 33 and the intermediary frame member 34 when the protective container 31 is made from a metal material.

With the thus structured communication device 12, each end portion positioned at a central portion of the antenna coil 2a for the primary sheet-like magnetic material 5a and the secondary sheet-like magnetic material 5b are partially overlapped to each other, in the similar manner as FIG. 28.

As shown in FIG. 31, at least a portion of the magnetic flux passes respectively through the primary sheet-like magnetic material 5a and the secondary sheet-like magnetic material 5b having a magnetic resistance exceedingly lesser than that in the air, and through the antenna coil 2a so as to form a magnetic flux path (magnetic flux loop) φ being flatly expanded in a manner shown with a broken line.

Also in this embodiment, the communication sensitivity would become highest when each of the tip-end portions for the primary sheet-like magnetic material 5a and the secondary sheet-like magnetic material 5b are inserted inside the gap 35 to a point reaching the outside of the protective container 31, in the similar manner as FIG. 30.

As mentioned above, when forming the protective container 31 with a conductive material, aluminum or an alloy thereof would serve to provide a satisfactory communication. However, experiments have revealed that even if other conductive materials (magnetic metal) such as stainless steel, copper, brass are employed to form the protective container 31, communication can be performed by forming a thin layer made from aluminum or an alloy thereof at an inner surface of the protective container 31.

Although not shown, the primary sheet-like magnetic material 5a and the secondary sheet-like magnetic material 5b can be formed in a shape of a triangle in a manner where each sheet-like magnetic material having one peak portion thereof facing against a central portion of the antenna coil 2a is extended outward in a gradual area-expanding manner, or in a manner where each sheet-like magnetic material having one side portion thereof facing against a central portion of the antenna coil 2a is extended outward in a gradual area-reducing manner.

Even with such structure, the magnetic flux path φ expands outward in a surface direction of the antenna coil 2a to allow communication distance to expand and communication directivity to heighten, as in the similar manner as FIG. 28 and FIG. 29.

Figure 32:
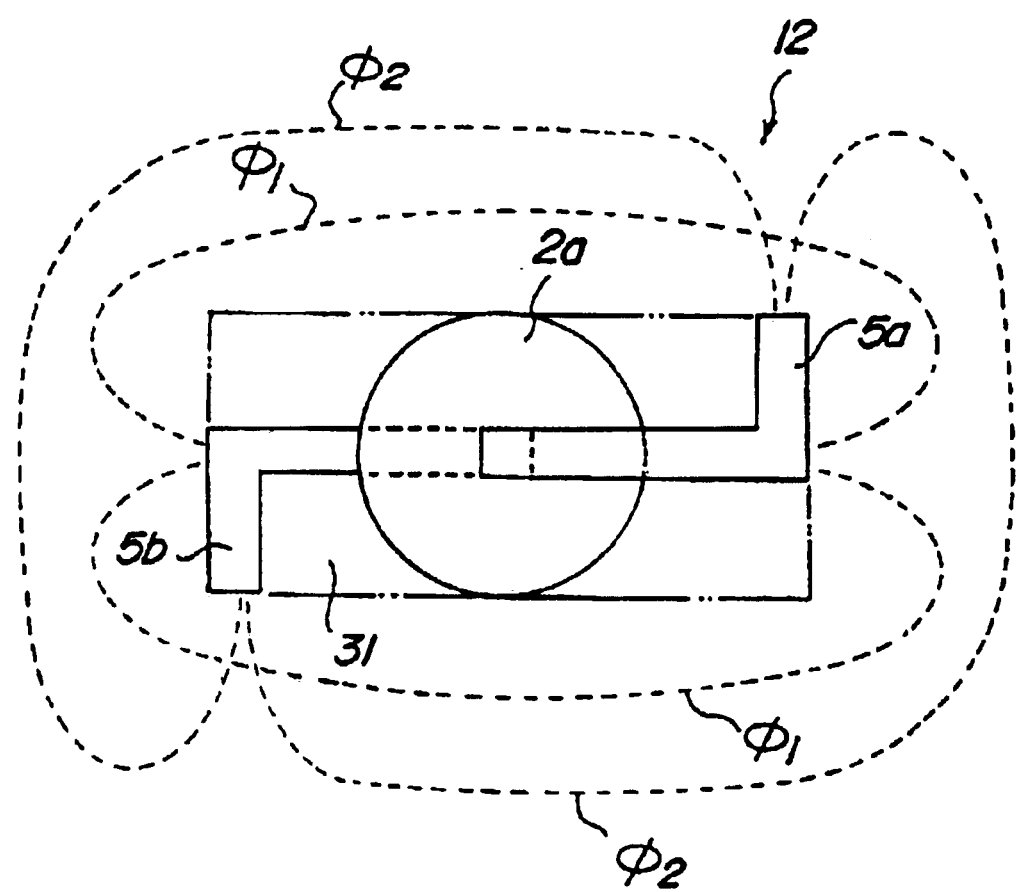
FIG. 32 is a plane view showing another embodiment of a communication device regarding this invention.

Further, FIG. 32 is a plan view showing another embodiment of the communication device 12. In this embodiment, the primary sheet-like magnetic material 5a and the secondary sheet-like magnetic material 5b are respectively formed in a letter L shape.

The primary sheet-like magnetic material 5a has one side being arranged parallel to a lateral direction in FIG. 32, has a tip-end portion being positioned on a top surface of a central portion of the antenna coil 2a; and has another side being extended in an upward direction (vertical direction) in FIG. 32. The secondary sheet-like magnetic material 5b has one side being arranged parallel to a lateral direction in FIG. 32, has a tip-end portion being positioned on a bottom surface of a central portion of the antenna coil 2a, and has another side being extended in an downward direction (vertical direction) in FIG. 32.

Each tip-end portion for the primary sheet-like magnetic material 5a and the secondary sheet-like magnetic material 5b having the antenna coil 2a sandwiched from the top and bottom are arranged in a manner partially overlapping each other. Furthermore, a primary magnetic flux path $\phi_1$ is formed from a side of the primary sheet-like magnetic material 5a in a lateral direction of FIG. 32 and a side of the secondary sheet-like magnetic material 5b in a lateral direction of FIG. 32 having the antenna coil 2a arranged therebetween, and a secondary magnetic flux path $\phi_2$ is formed from a side of the primary sheet-like magnetic material 5a in a lateral and vertical direction of FIG. 32 and a side of the secondary sheet-like magnetic material 5b in a lateral and vertical direction of FIG. 32 having the antenna coil 2a arranged therebetween.

Thus structured, communication distance can be expanded in both the lateral and vertical direction of FIG. 32 by the primary magnetic flux path $\phi_1$ and the secondary magnetic flux path $\phi_2$, and communication directivity for both of the directions can be heightened. Accordingly, thus structured, a communication device 12 having no (or little) directivity in a plane direction can be provided.

Although FIG. 32 shows the antenna coil 2a, the primary sheet-like magnetic material 5a, and the secondary sheet-like magnetic material 5b being housed inside the protective container 31 indicated with a long dash dot dot line, the sealing container 36 as in FIG. 31 can also be employed in this embodiment.

Figure 33:
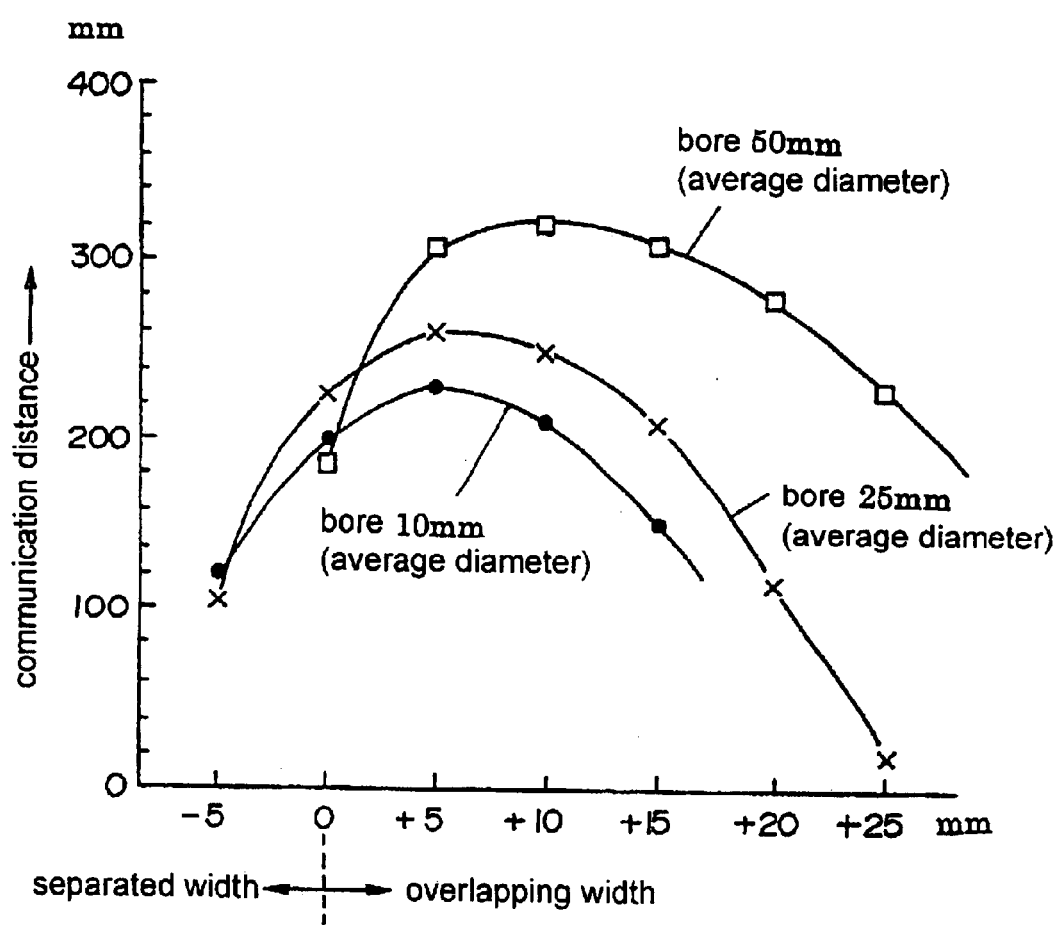
FIG. 33 is a graph showing a measured result of communication distance regarding the communication device of FIG. 31.

FIG. 33 is a measured experiment result of communication distance for the communication device 12 of FIG. 31. The communication device 12 used in the experiment is manufactured as follows. First, an RFID tag 1a, which has a disk-shaped antenna coil 2a and a semiconductor IC chip 4 for ASK type communication molded by a resin-made sealing container 36, is prepared, and then, a primary sheet-like magnetic material 5a is adhered to a top surface of the sealing container 36 and a secondary sheet-like magnetic material 5b is adhered to a bottom surface of the sealing container 36, and then, such comprising members are housed as a whole into a protective container 31 made from aluminum.

The sheet-like amorphous magnetic material having a specific magnetic permeability of 800 thousand made from Allied Chemical Corporation is used for the primary sheet-like magnetic material 5a and for the secondary sheet-like magnetic material 5b. As shown in FIG. 31, the protective container 31 has a top lid 32, a bottom lid 33, and an intermediary frame member 34, in which all of the components thereof are made from aluminum.

A gap 35 having a thickness of several hundred $\mu$m and serving as a magnetic flux leakage path is arranged along an entire periphery at a connecting portion between the top lid 32 and the intermediary frame member 34. The protective container 31 has a side length (lateral length in FIG. 31) of 85 mm, a vertical length of 55 mm, and a thickness of 1 mm.

The communication distance regarding the foregoing communication device 12 has been measured using three types of antenna coils 2a respectively having a bore (average diameter) of 10 mm, 25 mm, and 50 mm in relation with the overlapping degree of the primary sheet-like magnetic material 5a and the secondary sheet-like magnetic material 5b.

It should now be noted that the width of the primary sheet-like magnetic material 5a and the secondary sheet-like magnetic material 5b are matched with the bore of the respective corresponding antenna coils 2a, and that the length of the primary sheet-like magnetic material 5a and the secondary sheet-like magnetic material 5b are substantially matched to the length of the protective container 31 in the lateral direction (length in the lateral direction shown in FIG. 31), that is, 85 mm.

In FIG. 33, the lateral axis shows the overlapping relation between the primary sheet-like magnetic material 5a and the secondary sheet-like magnetic material 5b along the central portion of the antenna coil 2a, wherein the "+" sign indicates an overlapping width, and the "−" sign indicates a separated width. Further, the vertical axis shows the measured communication distance. The measuring of communication distance was performed by arranging a read/write device in a direction extending to a longitudinal direction of the respective communication devices 12 (lateral direction in FIG. 31), and the unit used for measuring the communicable sending/receiving distance between the RFID tag 1a by electromagnetic wave was mm (millimeters).

Although, there is a difference depending on the bore of the antenna coil 2a, the result of FIG. 33 reveals that communication is possible when the relation between the end portion of the primary sheet-like magnetic material 5a and the secondary sheet-like magnetic material 5b at the central portion of the antenna coil 2a ranges from a separated width of approximately 5 mm through an overlapping width of approximately 25 mm.

However, the suitable overlapping range would be from 0 mm through 20 mm, and a more suitable overlapping range would be approximately 10 mm±(plus or minus) 5 mm. However, there is a tendency that the most suitable range would shift to the one having a large overlapping range in proportion to the bore of the antenna coil 2a. Further, it has been revealed that the larger the bore of the antenna coil 2a becomes the larger the communication distance would expand.

As shown in FIG. 33, communication distance comparatively expands when the center sides for the primary sheet-like magnetic material 5a and the secondary sheet-like magnetic material 5b are relatively overlapped with each other. Nevertheless, communication is possible even when the overlapping is zero or slightly separated (e.g., approximately 5 mm). Accordingly, a suitable "overlapping" is to be chosen when priority is placed on communication distance, and "an overlapping of zero or separation (−)" is to be chosen when priority is placed on cutting down in expensive amorphous material.

For reference, in a case where the overlapping width between the primary sheet-like magnetic material 5a and the secondary sheet-like magnetic material 5b is 0 mm, a communication device 12 having an antenna coil 2a of a 50 mm $\phi$ bore had a communication distance measuring 150 mm when both sheet-like magnetic materials had a width of 10 mm and had a communication distance measuring 90 mm when both sheet-like magnetic materials had a width of 5 mm.

Further, in the same manner, the communication distance for each communication device 12 has been measured in a case where a top lid 32 of a protective container 31 is altered to a non-conductive resin material instead of using aluminum. The result showed a communication distance expanding approximately twice the distance compared to that of FIG. 33.

Figure 34:
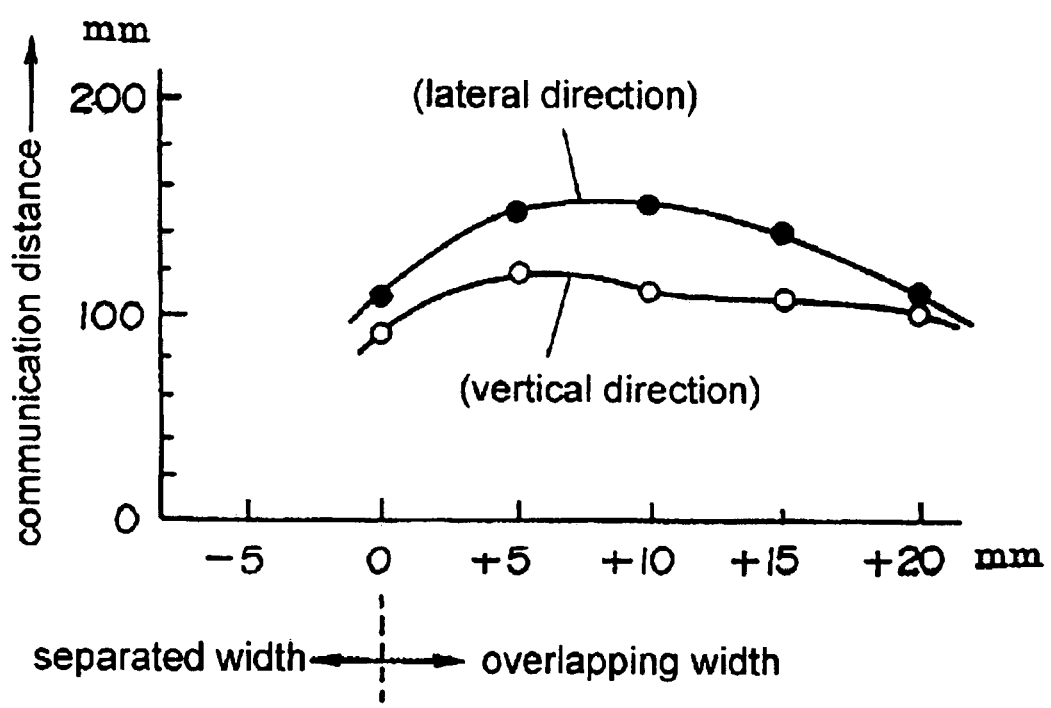
FIG. 34 is a graph showing a measured result of communication distance regarding the communication device of FIG. 32.

FIG. 34 is an experiment result of communication distance measured in the same manner as FIG. 33 regarding the communication device 12 of FIG. 32 being housed inside the protective container 31 as in FIG. 31. The communication device 12 employs an RFID tag 1a having an antenna coil 2a with a 25 mm φ bore and a semiconductor IC chip 4 for ASK type communication sealed into a resin-made sealing container 36; a sheet-like amorphous magnetic material, which is made by Allied Chemical Corporation having an L-letter shape with a 20 mm width, serving a primary sheet-like magnetic material 5a and a secondary sheet-like magnetic material 5b is then adhered to the RFID tag 1a; thereby, such comprising members are molded into an aluminum-made protective container 31.

The measurements for the primary sheet-like magnetic material 5a and the secondary sheet-like magnetic material 5b are respectively matched with the length and width of the protective container 31 as in FIG. 32. The result in FIG. 34 reveals that the communication distance in both the lateral and vertical direction of FIG. 32 is 100 mm or more when the overlapping width between the primary sheet-like magnetic material 5a and the secondary sheet-like magnetic material 5b range from 0 mm through 20 mm.

Furthermore, the communication distance for each communication device 12 has been measured in a case where a top lid 32 of a protective container 31 is altered to a non-conductive resin material instead of using aluminum, and the result showed a communication distance expanding approximately twice the distance compared to that of FIG. 34.

In the above description, the protective container 31 is comprised of the top lid 32, the bottom lid 33, and the intermediary frame member 34, in which all of thus members are made from a same material. Nevertheless, the members could be formed into a combination where each of the members is made from different material. In such case it is possible for the top lid 32 to be omitted. When omitting the top lid 32, the protective container 31 comprised of the bottom lid 33 and the intermediary frame member 34 is sealed by applying therein a durable resin or the like.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A communication device attached to a conductive installing object comprising:
    an antenna coil formed into a flat concentric disk shape;
    a sender/receiver circuit;
    a memory circuit; and
    a control circuit for non-contact electromagnetic wave communication with an exterior of the communication device by using the antenna coil,
    wherein a single sheet-like magnetic material with a high specific magnetic permeability is arranged on only one side of the antenna coil, the side of the antenna coil mounted on the conductive installing object so that one end of the sheet-like magnetic material is located at an intermediary portion between a diametral center of the antenna coil and an inner peripheral face of the antenna coil and the other end of the sheet-like magnetic material is located at an exterior of said antenna coil.

2. The communication device according to claim 1, wherein the sheet-like magnetic material is a sheet of an amorphous magnetic material with a high specific magnetic permeability.

3. The communication device according to claim 1, wherein the communication device is an RFID tag or a read/write device thereof.

4. An installation structure for the communication device according to claim 1, wherein the communication device is installed on a surface of a conductive installing object or installed inside an installment groove portion arranged at the surface of the conductive installing object.

5. The communication device according to claim 1, wherein the communication device is housed in a conductive container that is divided into at least two parts, and a flux leak path for leaking electromagnetic wave between the antenna coil and an exterior of the container is formed between a face of one divided part of the container and a face of another divided part thereof.

6. The communication device according to claim 5, the container being separable into two portions and having a hinge mechanism arranged on one end portion of the container for allowing the two portions to be openable relative to each other.

7. The communication device according to claim 5, wherein the container is formed by overlapping and joining two sheet-like members.

8. The communication device according to claim 5, wherein the communication device is a metal nameplate capable of non-contact communication.

9. The communication device according to claim 1, wherein the sheet-like magnetic material extends from the one end of the sheet-like magnetic material away from the diametral center of the antenna coil towards the other end of the sheet-like magnetic material located at the exterior of the antenna coil without passing through the diametral center of the antenna coil.

10. A communication device comprising an antenna coil, a sender/receiver circuit, a memory circuit, and a control circuit for non-contact electromagnetic wave communication with an exterior of the communication device by using the antenna coil,
    wherein the antenna coil is formed into a flat concentric disk shape,
    wherein the antenna coil is arranged between a primary sheet-like magnetic material with a high specific magnetic permeability and a secondary sheet-like magnetic material with a high specific magnetic permeability, and
    wherein the primary sheet-like magnetic material and the secondary sheet-like magnetic material are extended along the antenna coil from a center portion of the antenna coil to an outer area in opposite directions relative to each other, and wherein the primary sheet-like maanetic material and the secondary sheet-like magnetic material overlap at a center portion of the antenna coil.

11. The communication device according to claim 10, wherein the sheet-like magnetic material is a sheet of an amorphous magnetic material with a high specific magnetic permeability.

12. The communication device according to claim 10,
    wherein the antenna coil, the sender/receiver circuit, the memory circuit, and the control circuit are housed inside a non-conductive sealed container, and
    wherein the primary sheet-like magnetic material and the secondary sheet-like magnetic material are arranged having the sealed container therebetween.

13. The communication device according to claim 10, wherein the communication device is housed in a conductive container that can be divided to at least two parts, wherein a flux leak path for leaking electromagnetic wave between the antenna coil and an exterior of the communication device is formed at the divided portion of the container, and wherein the first sheet-like magnetic material and second sheet-like magnetic material are extended along the antenna coil from the center portion thereof in respective directions opposite to each other to the flux leak path portion.

14. The communication device according to claim 13, wherein the antenna coil, the sender/receiver circuit, the memory circuit, and the control circuit are contained in a non-conductive sealing container, and wherein the first sheet-like magnetic material and second sheet-like magnetic material are arranged via the sealing container.

15. A method of manufacturing a communication device comprising an antenna coil, a sender/receiver circuit, a memory circuit, and a control circuit for non-contact electromagnetic wave communication with an interior of the communication device by using the antenna coil, the method comprising:

forming the antenna coil into a flat concentric disk shape, housing the antenna coil, the sender/receiver circuit, the memory circuit, and the control circuit inside a non-conductive sealed container, plurally arranging the sealed container in a prescribed interval along a longitudinal direction of a thin long primary sheet material, and plurally arranging a sheet-like magnetic material with a high magnetic permeability in a prescribed interval along a longitudinal direction of a thin long secondary sheet material, wherein each container body and each sheet-like magnetic material are postionally adjusted relative to each other, in which the sheet-like magnetic materials is positionally adjusted to be arranged on one side of the antenna coil extending along the antenna coil from an intermediary portion between a diametral center of the antenna coil and an inner peripheral side to an outer area of one of the sides of the antenna coil in a case where the antenna coil has a concentric disk shape wherein the primary sheet material and the secondary sheet material are joined to each other, and wherein each combined body of the container body and the sheet-like magnetic material is divided.

16. The method of manufacturing a communication device according to claim 15, wherein the primary sheet material and the secondary sheet material are both conductive materials, wherein the sheet materials have a magnetic flux leakage path between the external and the internal formed at a bonding rim portion thereof, and wherein the sheet-like magnetic material is extended to a portion of the magnetic flux leakage path.

17. The method of manufacturing a communication device according to claim 15, the sheet-like magnetic material is formed upon the secondary sheet material by mixing a powder of an amorphous alloy into a resin binder with a high density, and printing.

18. A method of communication with a communication device attached to a conductive installing object comprising an antenna coil, a sender/receiver circuit, a memory circuit, and a control circuit for non-contact electromagnetic wave communication with an interior of the communication device by using the antenna coil, the method comprising:

forming the antenna coil into a flat concentric disk, and arranging a single sheet-like magnetic material with a high specific magnetic permeability on only one side of the antenna coil;

mounting the side of the antenna coil on the conductive installing object so that one end of the sheet-like magnetic material is located at an intermediary portion between a diametral center of the antenna coil and an inner peripheral face of the antenna coil and the other end of the sheet-like magnetic material extends to a flux leak path portion.

19. The method of communication with a communication device according to claim 18, wherein arranging the sheet-like magnetic material comprises:

extending the sheet-like magnetic material from the one end of the sheet-like magnetic material away from the diametral center of the antenna coil to the flux leak path portion without passing through the diametral center of the antenna coil.

20. A method of communication with a communication device comprising an antenna coil, a sender/receiver circuit, a memory circuit, and a control circuit for non-contact electromagnetic wave communication with an exterior of the communication device by using the antenna coil, the method comprising:

forming the antenna coil into a flat concentric disk shape; and arranging the antenna coil between a primary sheet-like magnetic material with a high specific magnetic permeability and a secondary sheet-like magnetic material with a high specific magnetic permeability, wherein the primary sheet-like magnetic material and the secondary sheet-like magnetic material are extended along the antenna coil from a center portion of the antenna coil to an outer area in opposite directions relative to each other, wherein the primary sheet-like magnetic material and the secondary sheet-like magnetic material are arranged overlapping each other at a center portion of the antenna coil, and wherein non-contact electromagnetic wave communication with the external is performed in a state where directivity of the antenna coil is heightened by the sheet-like magnetic material.

* * * * *

UNITED STATES PATENT AND TRADEMARK OFFICE
CERTIFICATE OF CORRECTION

PATENT NO. : 6,927,738 B2  
DATED : August 9, 2005  
INVENTOR(S) : Fujio Senba et al.

Page 1 of 1

It is certified that error appears in the above-identified patent and that said Letters Patent is hereby corrected as shown below:

Column 35,  
Line 18, change "interior" to -- exterior --.

Column 36,  
Line 8, change "interior" to -- exterior --.

Signed and Sealed this

Eighteenth Day of October, 2005

JON W. DUDAS  
*Director of the United States Patent and Trademark Office*